US012620302B2

(12) United States Patent (10) Patent No.: US 12,620,302 B2

Dimberg (45) **Date of Patent: *May 5, 2026**

(54) RETROFIT REMOTE CONTROL DEVICE

(71) Applicant: Lutron Technology Company LLC, Coopersburg, PA (US)

(72) Inventor: Chris Dimberg, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/776,786

(22) Filed: Jul. 18, 2024

(65) Prior Publication Data

US 2024/0371257 A1      Nov. 7, 2024

Related U.S. Application Data

(63) Continuation of application No. 18/124,247, filed on Mar. 21, 2023, now Pat. No. 12,073,712, which is a (Continued)

(51) Int. Cl.
  G08C 17/02      (2006.01)
  H01H 3/22      (2006.01)
  (Continued)

(52) U.S. Cl.
  CPC .............. G08C 17/02 (2013.01); H01H 3/22 (2013.01); H01H 9/02 (2013.01); H01H 23/12 (2013.01); H01H 23/145 (2013.01); H01H 23/24 (2013.01); H01M 50/20 (2021.01); H01M 50/216 (2021.01); H01M 50/251 (2021.01); H05B 47/19 (2020.01); H05B

*47/196* (2024.01); *H01H 2231/032* (2013.01); *H01H 2300/03* (2013.01); *H01M 2220/10* (2013.01); *H05B 47/1975* (2024.01)

(58) Field of Classification Search
  CPC ............. G08C 17/02; H01H 3/22; H01H 9/02
  See application file for complete search history.

(56) References Cited

U.S. PATENT DOCUMENTS 5,264,761 A    11/1993    Johnson et al.
7,834,856 B2    11/2010    Grinshpoon et al.
      (Continued)

FOREIGN PATENT DOCUMENTS

| CN | 2596671 Y | 12/2003 |
| CN | 108091810 A | 5/2018 |
| CN | 109416991 A | 3/2019 |

*Primary Examiner* — Nabil H Syed

(74) *Attorney, Agent, or Firm* — Flaster Greenberg PC

(57) ABSTRACT

Remote control devices may control electrical loads and/or load control devices of a load control system without accessing electrical wiring. The remote control device may be mounted over a mechanical switch that is installed in a wallbox. The remote control device may include a base, a battery, a battery holder, and a control unit. The base may be configured to attach the remote control device to the mechanical switch. The control unit may be configured to be removably attached to the base. The battery holder may be configured to retain the battery therein. The battery holder may be configured to be installed within the void defined by the housing. The battery holder may be operable between a first position in a lower portion of the void and a second position in an upper portion of the void.

28 Claims, 15 Drawing Sheets

Related U.S. Application Data continuation of application No. 16/874,433, filed on May 14, 2020, now Pat. No. 11,636,754.

(60) Provisional application No. 62/847,494, filed on May 14, 2019.

(51) Int. Cl.

| | |
|---|---|
| *H01H 9/02* | (2006.01) |
| *H01H 23/12* | (2006.01) |
| *H01H 23/14* | (2006.01) |
| *H01H 23/24* | (2006.01) |
| *H01M 50/20* | (2021.01) |
| *H01M 50/216* | (2021.01) |
| *H01M 50/251* | (2021.01) |
| *H05B 47/175* | (2020.01) |
| *H05B 47/19* | (2020.01) |

(56) References Cited

U.S. PATENT DOCUMENTS

| | | | |
|---|---|---|---|
| 9,208,965 B2 | 12/2015 | Busby et al. | |
| 9,418,802 B2 | 8/2016 | Romano et al. | |
| 9,520,247 B1 | 12/2016 | Finnegan et al. | |
| 9,583,288 B2 | 2/2017 | Jones et al. | |
| 9,799,469 B2 | 10/2017 | Bailey et al. | |
| 9,930,780 B1 | 3/2018 | Ghabra et al. | |
| 9,959,997 B2 | 5/2018 | Bailey et al. | |
| 10,211,013 B2 | 2/2019 | Dimberg | |
| 2008/0111491 A1 | 5/2008 | Spira et al. | |
| 2012/0292174 A1 | 11/2012 | Mah et al. | |
| 2014/0117871 A1 | 5/2014 | Swatsky et al. | |
| 2015/0077021 A1 | 3/2015 | McCarthy et al. | |
| 2015/0294816 A1 | 10/2015 | Evers et al. | |
| 2015/0371534 A1 | 12/2015 | Dimberg et al. | |
| 2016/0073479 A1 | 3/2016 | Erchak et al. | |
| 2017/0105176 A1 | 4/2017 | Finnegan et al. | |
| 2017/0193814 A1 | 7/2017 | Dimberg et al. | |
| 2017/0278383 A1 | 9/2017 | Dimberg et al. | |
| 2017/0278647 A1 | 9/2017 | Dimberg et al. | |
| 2017/0278652 A1 | 9/2017 | Dimberg et al. | |
| 2017/0280533 A1 | 9/2017 | Dimberg et al. | |
| 2017/0280534 A1 | 9/2017 | Dimberg et al. | |
| 2017/0352506 A1 | 12/2017 | Dimberg | |
| 2017/0354011 A1 | 12/2017 | Dimberg et al. | |
| 2017/0354012 A1 | 12/2017 | Bard et al. | |
| 2017/0354021 A1 | 12/2017 | Dimberg et al. | |
| 2017/0354022 A1 | 12/2017 | Dimberg et al. | |
| 2017/0354023 A1 | 12/2017 | Dimberg et al. | |
| 2018/0005742 A1 | 1/2018 | Newman et al. | |
| 2018/0110114 A1 | 4/2018 | Karc et al. | |
| 2018/0116039 A1 | 4/2018 | Harte et al. | |
| 2018/0190451 A1 | 7/2018 | Scruggs | |
| 2019/0006129 A1 | 1/2019 | Dimberg et al. | |
| 2019/0073898 A1 | 3/2019 | Dimberg et al. | |
| 2019/0141819 A1 | 5/2019 | Aylward et al. | |
| 2020/0144007 A1 | 5/2020 | Shivell | |

RETROFIT REMOTE CONTROL DEVICE

CROSS-REFERENCE TO RELATED APPLICATIONS

This application is a continuation of Non-Provisional U.S. patent application Ser. No. 18/124,247, filed Mar. 21, 2023, which is a continuation of Non-Provisional U.S. patent application Ser. No. 16/874,433, filed May 14, 2020, now issued as U.S. Pat. No. 11,636,754 on Apr. 25, 2023, which claims the benefit of Provisional U.S. Patent Application No. 62/847,494, filed May 14, 2019, the disclosures of which are incorporated herein by reference in their respective entireties.

BACKGROUND

During the installation of typical load control systems, standard mechanical switches, such as traditional toggle switches or decorator paddle switches, may be replaced by more advanced load control devices, such as dimmer switches, that control the amount of power delivered from an alternating current (AC) power source to one or more electrical loads. Such an installation procedure typically requires that the existing mechanical switch be disconnected from the electrical wiring and removed from a wallbox in which it is mounted, and that the load control device then be connected to the electrical wiring and installed in the wallbox. An average consumer may not feel comfortable performing the electrical wiring required in such an installation. Accordingly, such a procedure may typically be performed by an electrical contractor or other skilled installer. However, hiring an electrical contractor may be cost prohibitive to the average consumer.

Controllable light sources, such as controllable screw-in light-emitting diode (LED) lamps, may provide an easier solution for providing advanced control of lighting. For example, an older incandescent lamp may simply be unscrewed from a socket and the controllable light source may be screwed into the socket. The controllable light sources may be controlled by remote control devices. However, the sockets in which the controllable light sources are installed may be controlled by an existing wall-mounted light switch. When the wall-mounted light switch is operated to an off position, power to the controllable light source may be cut, such that the controllable light source may no longer respond to commands transmitted by the remote control devices. Accordingly, it is desirable to prevent operation of such a wall-mounted light switch to ensure that the delivery of power to the controllable light source continues uninterrupted.

SUMMARY

As described herein, an example remote control device may provide a simple retrofit solution for existing switched control systems. Implementation of the remote control device, for example in existing switched control systems, may enable energy savings and/or advanced control features, for example without requiring any electrical re-wiring and/or without requiring the replacement of any existing mechanical switches.

The remote control device may be configured to control one or more electrical loads, such as lighting loads, and/or load control devices. The remote control device may be configured to be mounted over the respective actuators of existing mechanical switches that, for example, may control whether power is delivered to the one or more electrical loads. The remote control device may be configured to control one or more load control devices of a load control system without requiring access to the electrical wiring of the load control system. One or more electrical loads may be electrically connected to a load control device such that the load control device may control an amount of power delivered to the one or more electrical loads. The control unit of the remote control device may be configured to transmit one or more commands for controlling the electrical loads via wireless communication.

The remote control device may be configured to maintain the actuators of mechanical switches over which they are installed in respective on positions, such that users of the remote control device are not able to mistakenly switch the actuators to the off position, which may cause one or more electrical load to be unpowered such that the one or more electrical loads cannot be controlled by one or more remote control device. The remote control device may be configured to control multiple types of electrical loads on a single electrical circuit, for instance substantially in unison. A load control system may include multiple remote control devices that are configured to provide individual, such as zoned control of each of a plurality of electrical loads coupled to a single electrical circuit.

The remote control device may include a base, a battery, a battery holder, and a control unit. The base may define an opening that is configured to receive a protruding portion of a paddle actuator of the mechanical switch therein. The protruding portion of the paddle actuator may project outward when the mechanical switch is operated into a position that causes power to be delivered to the electrical load. When the protruding portion is received in the opening the base at least partially surrounds the paddle actuator. The base may be configured to attach the remote control device to the mechanical switch. For example, the base may be configured to be attached to the protruding portion of the paddle actuator and/or the bezel of the mechanical switch.

The control unit may be configured to be removably attached to the base. The control unit may include a control interface, a housing, and/or a wireless communication circuit. The control unit may be configured to translate a user input from the control interface into a control signal that controls a load control device. The control unit may be configured to cause the wireless communication circuit to transmit the control signal. The housing may include an upper wall, a lower wall, and opposed side walls. The housing may define a void bounded by the upper wall, the lower wall, and the opposed sidewalls.

The battery may be configured to power the control unit. The battery holder may be configured to retain the battery therein. The battery holder may be configured to be installed within the void defined by the housing. The battery holder may be operable (e.g., relative to the housing) between a first position in a lower portion of the void and a second position in an upper portion of the void. The battery holder may be configured to be in the first position when an upper portion of the paddle actuator is the protruding portion. The battery holder may be configured to be in the second position when a lower portion of the paddle actuator is the protruding portion. The battery holder may be configured to be translated within the void between the first position and the second position. Alternatively, the battery holder may be configured to pivot about a pivot axis such that the battery holder is operated between the first position and the second position.

DETAILED DESCRIPTION

FIGS. 1-9 depict an example of a remote control device 100 that may be installed in a load control system, such as a lighting control system. The load control system may include a mechanical switch 190 that may be in place prior to installation of the remote control device 100, for example pre-existing in the load control system. As shown, the mechanical switch 190 may be a standard decorator paddle switch. The load control system may further include one or more electrical loads, such as lighting loads. The mechanical switch 190 may be coupled in series electrical connection between an alternating current (AC) power source and the one or more electrical loads.

Figure 4:
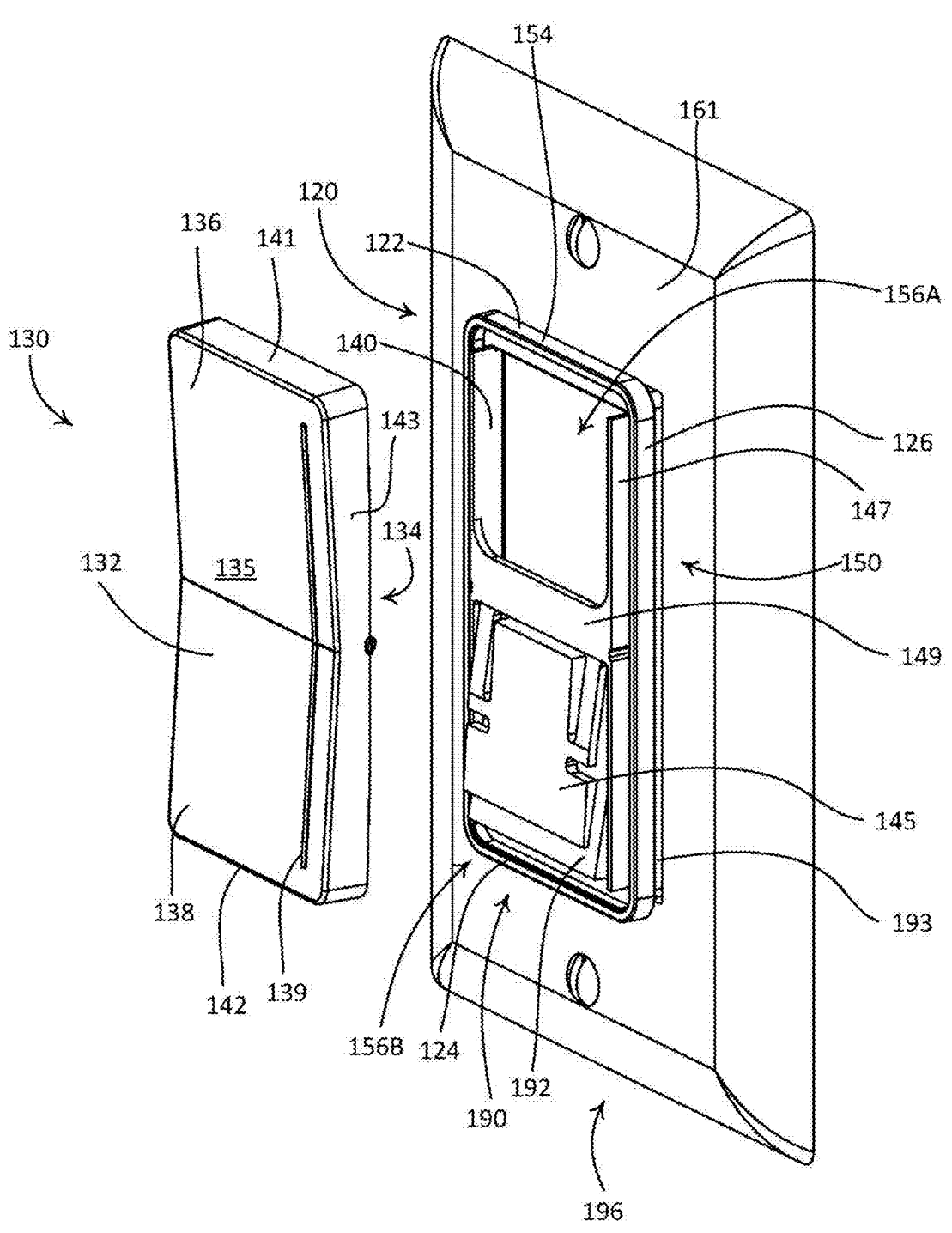
FIG. 4 is a partially exploded front perspective view of the example remote control device illustrated in FIG. 1.

The mechanical switch 190 may include a paddle actuator 192 that may be actuated to turn on and/or turn off, the one or more electrical loads. The mechanical switch 190 may include a bezel 193 that surrounds the paddle actuator 192. An upper portion of the paddle actuator 192 may protrude from the bezel 193 (e.g., in a first orientation) when the electrical load is off, and a lower portion of the paddle actuator 192 may protrude from the bezel 193 (e.g., in a second orientation, as shown in FIG. 4) when the electrical load is on, or vice versa. The mechanical switch 190 may include a yoke (not shown) that enables mounting of the mechanical switch 190 to a structure. For example, the yoke may be fastened to a single-gang wallbox that is installed in an opening of a structure (e.g., such as a wall, ceiling, etc.). As shown, a faceplate 196 may be secured to the mechanical switch 190, for instance to the yoke. The faceplate 196 may define a front surface 161 and an opposed rear surface 163. The front surface 161 may alternatively be referred to as an outer surface of the faceplate 196, and the rear surface 163 may alternatively be referred to as an inner surface of the faceplate 196. The faceplate 196 may define an opening therethrough that is configured to receive a portion of the mechanical switch 190. The faceplate 196 may be made of any suitable material, such as plastic. The remote control device 100 may be configured to be installed over the paddle actuator 192 of the mechanical switch 190 (e.g., mounted to the paddle actuator 192, the bezel 193, and/or the faceplate 196).

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a standalone dimmer switch that is electrically connected to the one or more lighting loads. In another example implementation, each of the one or more electrical loads may be a controllable light source (e.g., a screw-in light-emitting diode (LED) lamp) that each may include a respective integrated load control circuit and wireless communication circuit (e.g., the lighting load includes a corresponding load control device that is configured for wireless communication). It should be appreciated that the load control system is not limited to the example load control devices described herein.

The remote control device 100 may include a control unit 130 (e.g., a control module) and a base 120. The control unit 130 may be configured to be attached to the base 120. The control unit 130 may be mounted to the base 120. For example, the base 120 may be configured to attach the remote control device 100 to the mechanical switch 190. The base 120 may alternatively be referred to as a base portion, a mounting frame, or a mounting assembly. The control unit 130 and the base 120 may be configured such that the control unit 130 may be removably attached to the base 120. The base 120 may be mounted over (e.g., attached to) the paddle actuator 192 of the mechanical switch 190 without removing the faceplate 196. In this regard, the remote control device 100 may be mounted over an installed mechanical switch, such as the mechanical switch 190, without the need to remove the faceplate 196 and/or perform any electrical re-wiring of the mechanical switch 190.

As shown, the base 120 may include an adapter 140 and a frame 150. The adapter 140 may be configured to attach the base 120 to the mechanical switch. The adapter 140 may be configured to attach (e.g., removably attach) the control unit 130 to the base 120. The outer wall 154 may include a first end wall 122, an opposed second end wall 124, and opposed side walls 126 that extend from respective ends of the first end wall 122 to corresponding ends of the second end wall 124. In accordance with the illustrated orientation of the base 120, the first end wall 122 may be referred to as an upper end wall of the base 120 (e.g., or frame 150) and the second end wall 124 may be referred to as a lower end wall of the base 120 (e.g., or frame 150). The plate 152 may define a rear surface 128 of the base 120.

The adapter 140 may define extensions 147. The extensions 147 may extend proximate to the opposed side walls 126. The extensions 147 may extend from the bezel 193 of the mechanical switch 190. The extensions 147 may extend further than the opposed side walls 126. For example, the extensions 147 may be configured to engage the bezel 193 when the base 120 is mounted to the mechanical switch 190. The plate 149 may extend between the extensions 147 (e.g., proximate to a midpoint of the extensions 147). The adapter 140 may include a tab 145. The tab 145 may be attached to the plate 149. For example, the tab 145 may be cantilevered from the plate 149. The tab 145 may be configured to be attached to the paddle actuator 192 of the mechanical switch 190. For example, adhesive may be used to attach the tab 145 to the paddle actuator 192 of the mechanical switch 190.

The base 120 may define an upper opening 156A and a lower opening 156B. The upper opening 156A may be defined by the first end wall 122, the opposed side walls 126, and the plate 149. The lower opening 156B may be defined by the second end wall 124, the opposed side walls 126, and the plate 149. Each of the openings 156A, 156B may be configured to receive the protruding portion of the paddle actuator 192, for example, when the base 120 is installed over the mechanical switch 190. When the protruding portion of the paddle actuator 192 is received in one the openings 156A, 156B, the frame 150 may at least partially surround the paddle actuator 192.

The control unit 130 may include a housing 134. The housing 134 may include a user interface comprising an actuation portion 132. The housing 131 may define sidewalls that extend from the actuation portion 132. The sidewalls may include an upper wall 141, a lower wall 142, and opposed side walls 143. The upper wall 141, the lower wall 142, and the opposed side walls 143 may extend from the actuation portion 132 towards the bezel 193 of the mechanical switch 190 (e.g., from a perimeter defined by the actuation portion 132). As an example, the actuation portion 132 may be removably attached to the housing 134.

Figure 5:
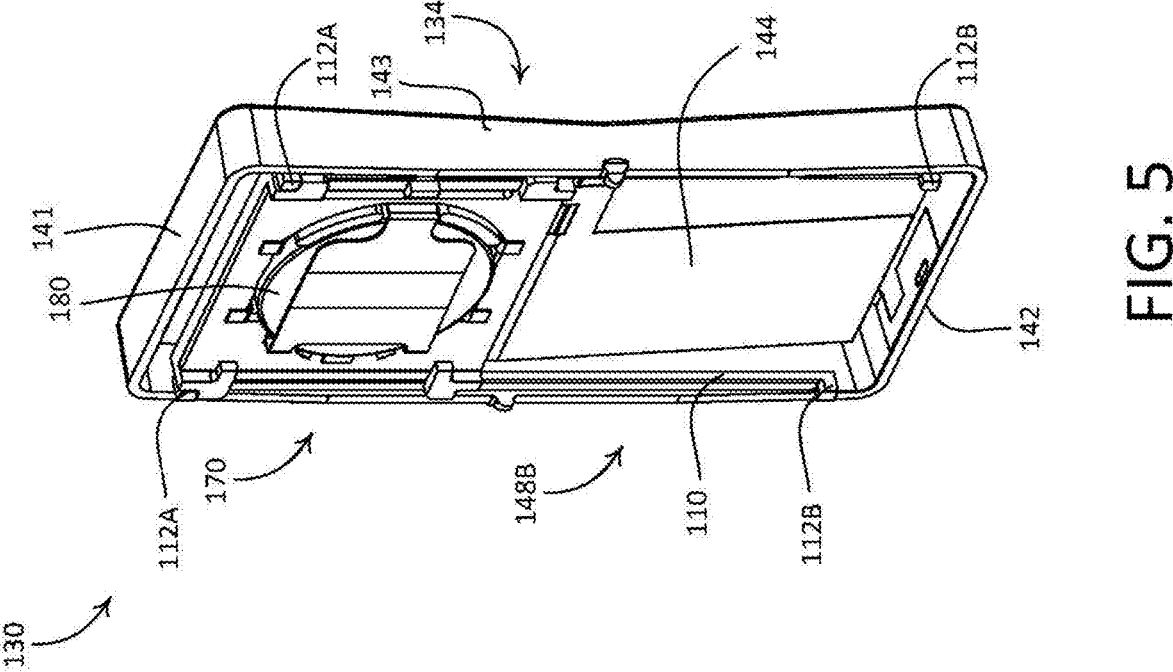
FIG. 5 is a rear perspective view of an example control unit of the example remote control device illustrated in FIG. 1 with the battery holder in a second position.
Figure 7:
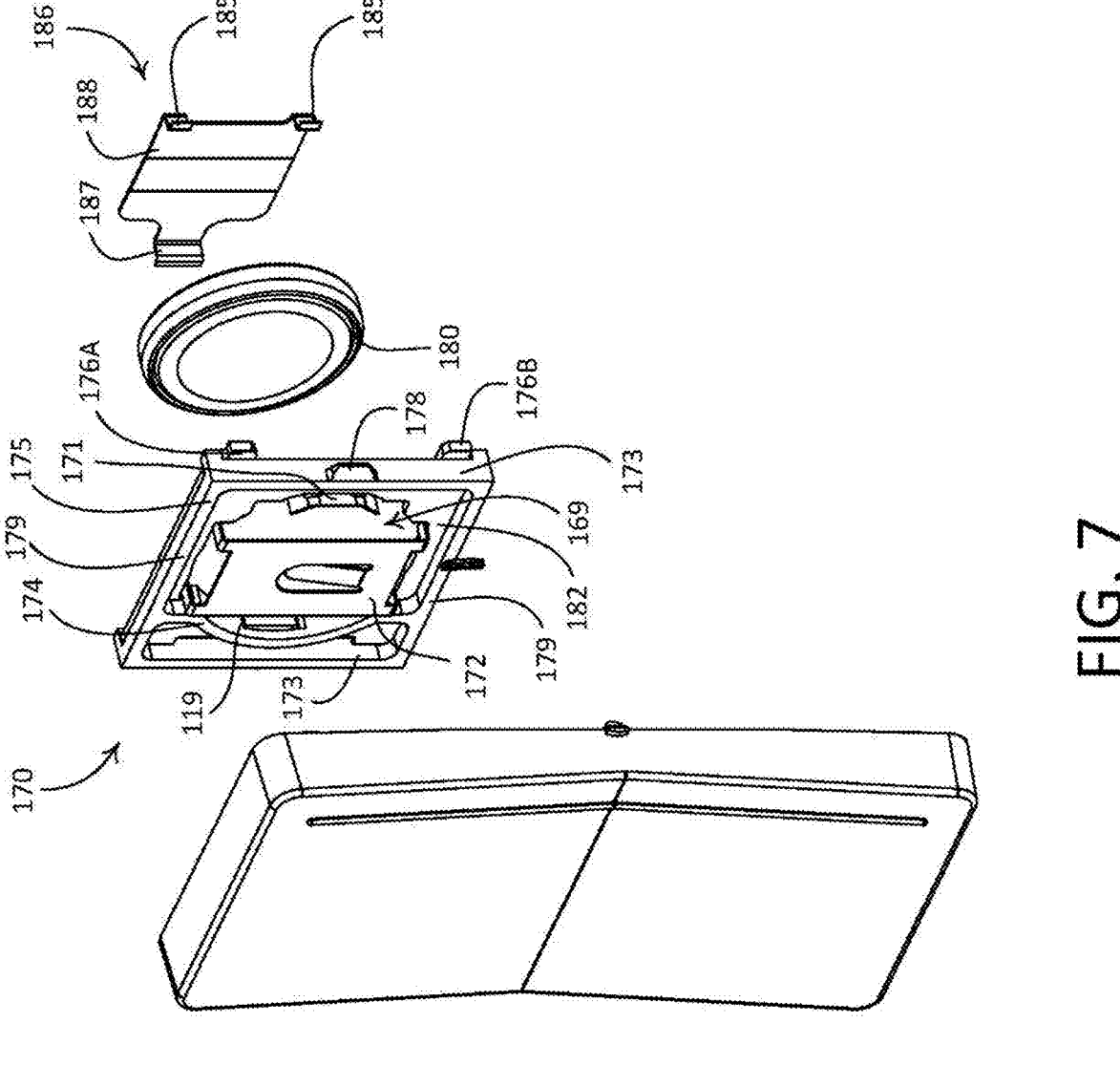
FIG. 7 is a partially exploded front perspective view of the example remote control device illustrated in FIG. 1.
Figure 8:
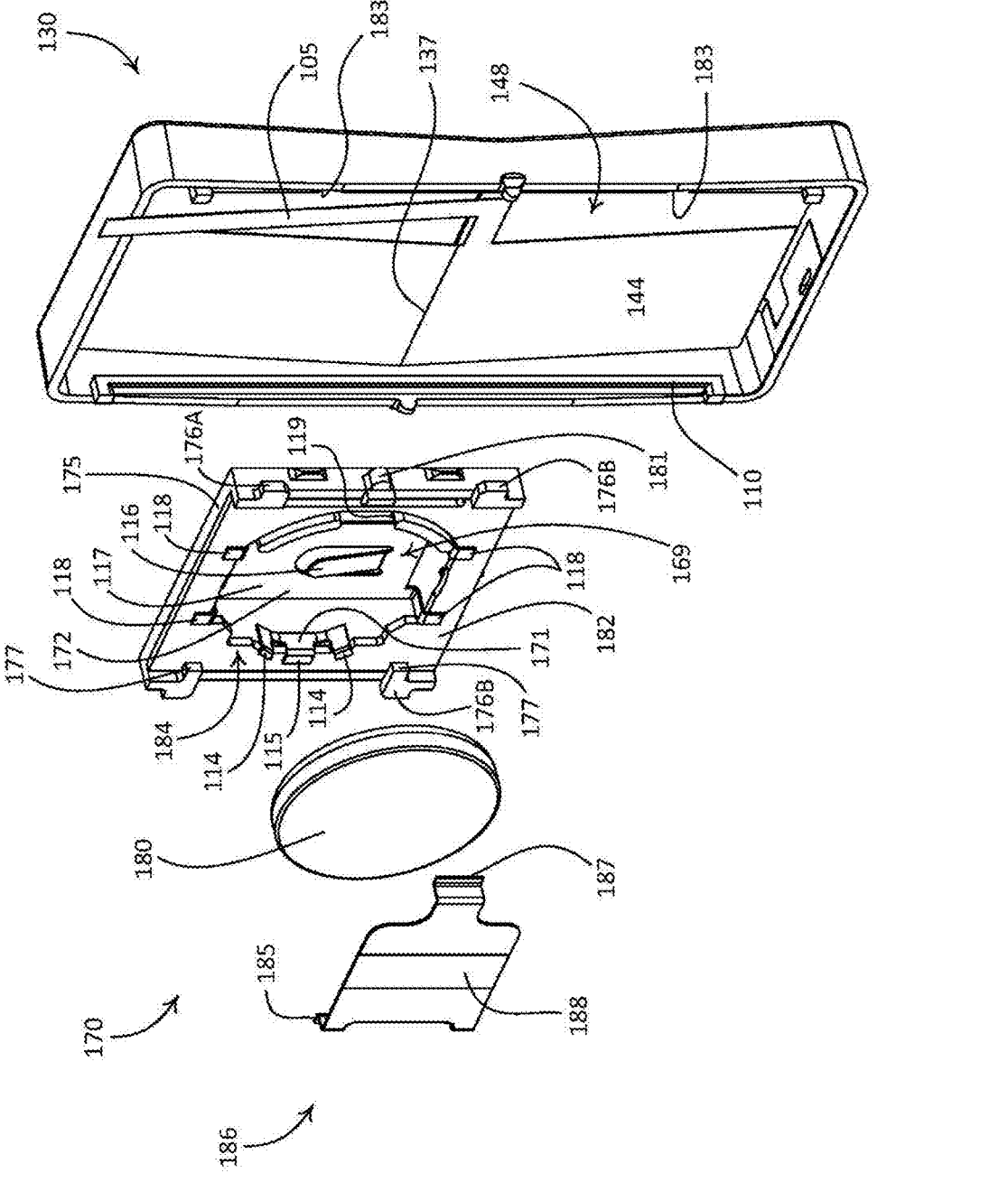
FIG. 8 is a partially exploded rear perspective view of the example remote control device illustrated in FIG. 1.
Figure 9:
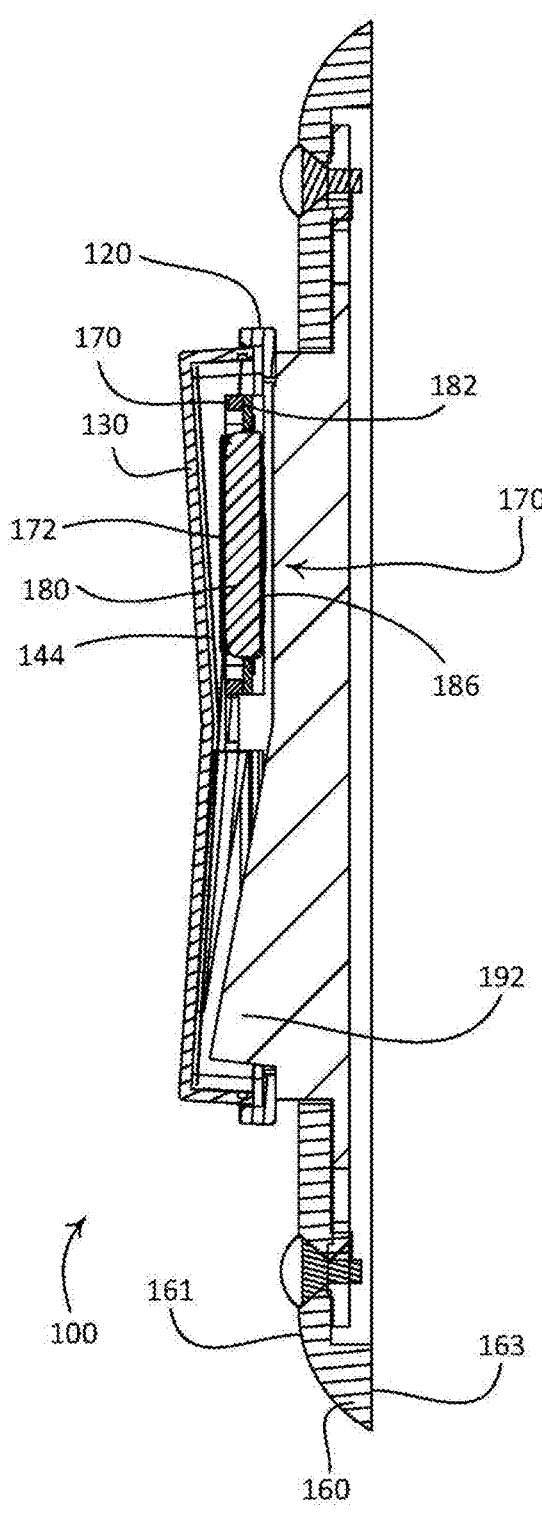
FIG. 9 is a cross-section view of the example remote control device illustrated in FIG. 1.

As shown in FIGS. 1-9, the control unit 130 may be rectangular in shape and elongate between the upper wall 141 and the lower wall 142. It should be appreciated that the control unit 130 is not limited to the illustrated rectangular geometry, and that control unit may alternatively be configured with other suitable geometries. In accordance with the illustrated orientation of the control unit 130, the upper wall 141 may be referred to as an upper end of the control unit 130 and the lower wall 142 may be referred to as a lower end of the control unit 130. The upper and lower walls 141, 142 of the control unit 130 may also be referred to as first and second ends of the housing 134, respectively. The control unit 130 may include a printed circuit board 144 (e.g., a flexible or rigid printed circuit board). The control unit 130 (e.g., the housing 134) may define a void 148 (FIG. 8). The void 148 may be configured to receive the printed circuit board 144 in an attached position. The void 148 may be defined by the upper wall 141, the lower wall 142, and the opposing side walls 143. The void 148 may include an upper portion 148A (FIG. 6) and a lower portion 148B (FIG. 5). The upper portion 148A may be proximate to the upper wall 141. The lower portion 148B may be proximate to the lower wall 142. The housing 134 may be made of any suitable material, such as plastic.

The actuation portion 132 may include a front surface 135 having an upper portion 136 and a lower portion 138. The actuation portion 132 may be configured to pivot about a central axis in response to an actuation of the upper portion 136 and the lower portion 138. The control unit 130 may be configured to control an electrical load. For example, the control unit 130 may be configured to turn the electrical load on in response to an actuation of the upper portion 136 and to turn the electrical load off in response to an actuation of the lower portion 138. The front surface 135 of the actuation portion 132 of the control unit 130 may define a user interface that is configured to receive inputs, such as gestures, from a user of the remote control device 100. The user interface may be configured as a touch sensitive surface (e.g., a capacitive touch surface) that is configured to receive (e.g., detect) inputs, such as gestures, from a user of the control unit 130. For example, the printed circuit board 144 may include one or more capacitive touch regions, or surfaces. The printed circuit board 144 may include one or more linear capacitive touch surfaces that face an inner surface of the actuation portion 132 when the printed circuit board 144 is disposed in the void 148. The front surface 135 of the actuation portion 132 may be configured to detect touches along an x-axis, a y-axis, or both an x-axis and a y-axis. The control unit 130 may also include a light bar 139 configured to be illuminated by one or more light sources (e.g., one or more LEDs). For example, the light bar 139 may be illuminated to visibly display information to a user of the control unit 130. The front surface 135 of the actuation portion 132 may be actuated along the light bar 139 to adjust the amount of power delivered to the lighting load according to the position of the actuation.

The control unit 130 may further include a control circuit (e.g., a processor, not shown) and a wireless communication circuit (e.g., an RF transceiver, not shown). The control unit 130 may be configured to translate one or more inputs (e.g., user inputs) from the user interface into respective control signals that may be used to control a load control device of a load control system. The one or more inputs may be applied via touches or presses of the upper portion 136 and/or lower portion 138 of the actuation portion 132. For example, the control circuit may be configured to receive input signals (e.g., that correspond to the user inputs) in response to actuations of the upper portion 136 and/or lower portion 138 by a user of the remote control device 100. For example, the input signals received by the control circuit may be the respective control signals translated from the control interface inputs. The control circuit may be configured to generate commands that the user desires the control unit 130 to execute in response to the input signals produced in response to actuations of the upper portion 136 and/or lower portion 138. The control unit 130 may be configured to cause the wireless communication circuit to transmit one or more control signals including the commands generated by the control circuit.

The control circuit may be configured to cause the wireless communication circuit to transmit respective commands that correspond to inputs and/or gestures received by the upper portion 136 and/or lower portion 138. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system.

The control circuit may be configured to cause the wireless communication circuit to transmit respective commands that correspond to interpreted gestures received at the capacitive touch surface. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system. An example of a configuration procedure for associating a remote control device with a load control device is described in greater detail in commonly-assigned U.S. Patent Publication No. 2008/ 0111491, published May 15, 2008, entitled RADIO-FREQUENCY LIGHTING CONTROL SYSTEM, the entire disclosure of which is hereby incorporated by reference.

Figure 1:
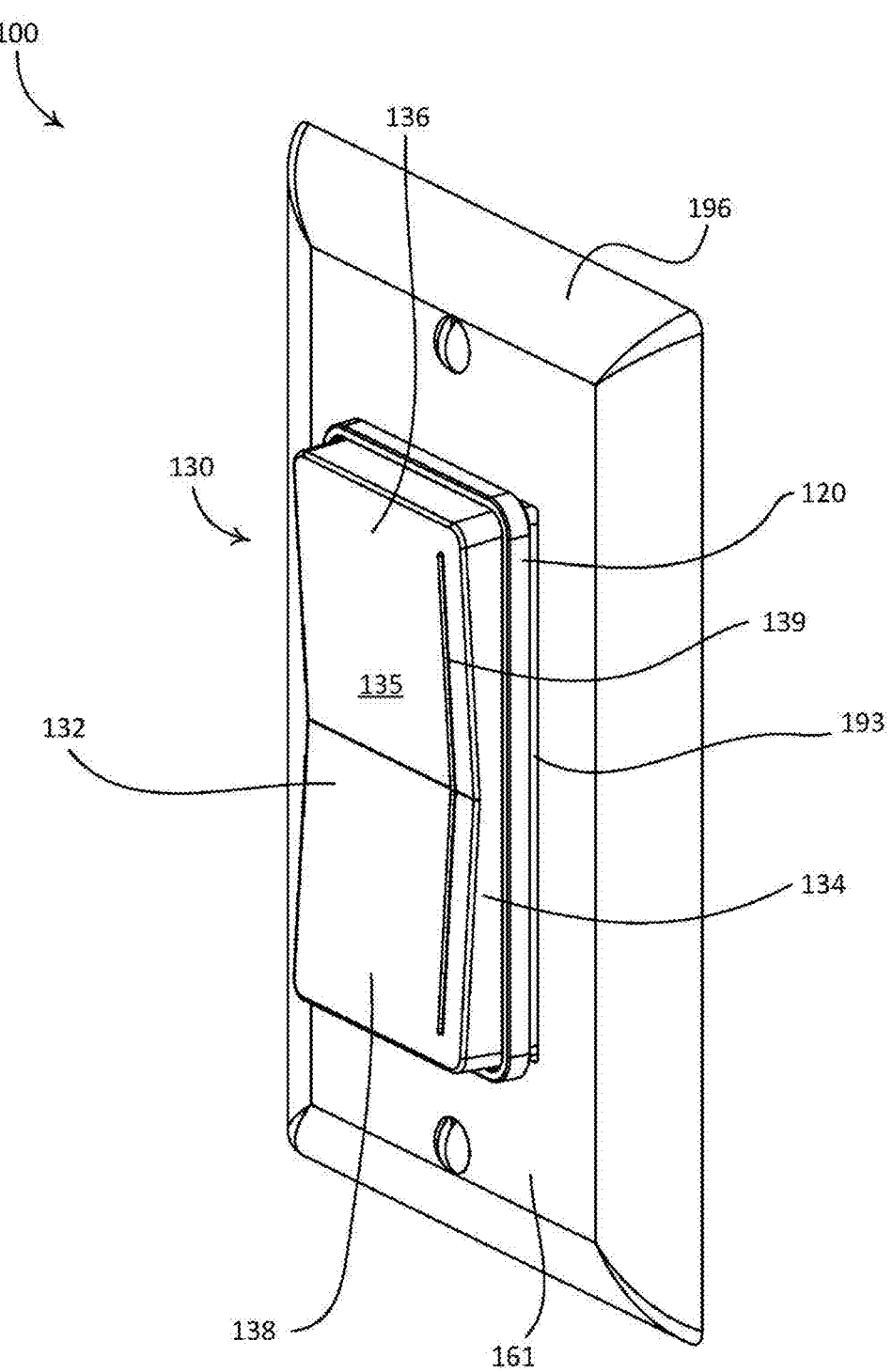
FIG. 1 is a perspective view of an example remote control device mounted over a mechanical switch.
Figure 3:
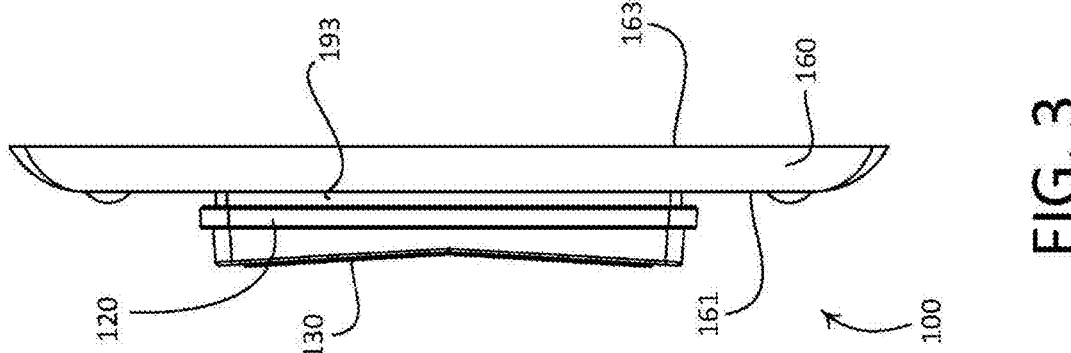
FIG. 3 is a side view of the example remote control device illustrated in FIG. 1.
Figure 2:
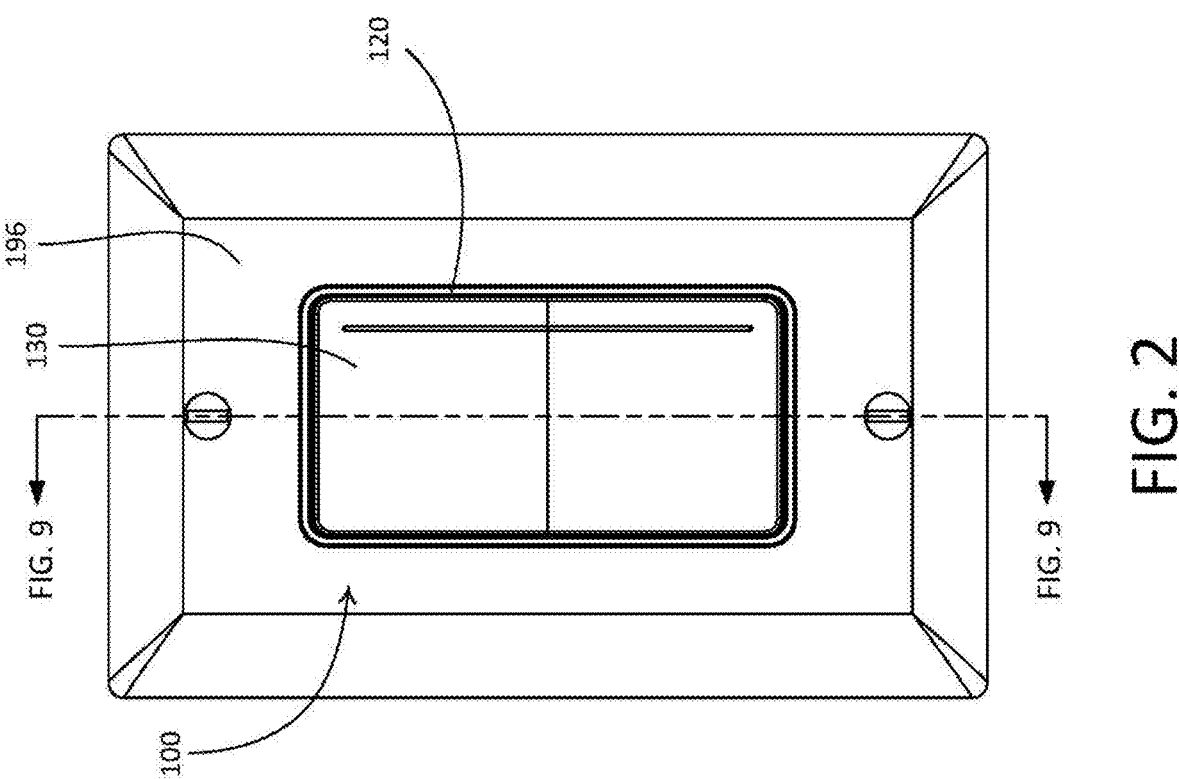
FIG. 2 is a front view of the example remote control device illustrated in FIG. 1.

The light bar 139 of the control unit 130 may be configured to provide a visual indication of a command issued by the remote control device 100. For example, the control circuit may be configured to, upon receiving a gesture indicative of a command to change an amount of power delivered to an electrical load, such as a command to dim a lighting load, indicate the amount of power delivered to the electrical load by temporarily illuminating a number of the LEDs that corresponds with the desired amount of power (e.g., the desired dimming level of the lighting load). In such an example, the control circuit may be configured to cause the LEDs to be illuminated simultaneously, to illuminate sequentially with some or little overlap before fading, or to otherwise illuminate as desired. The control unit 130 may be configured to be attached to the base 120 with the light bar 139 located on a predetermined side of the control unit 130 (e.g., the right side of the control unit as shown in FIG. 1), for example, such that the light bar 139 may be illuminated to indicate the amount of power presently being delivered to the electrical load. The printed circuit board 144 may define a fold 137 such that the light sources (e.g., LEDs) mounted thereto illuminate (e.g., indirectly) through the printed circuit board 144 to the light bar 139.

The illustrated control unit 130 may be battery-powered. The battery 180 (e.g., the illustrated coin cell battery) may be placed in electrical communication with the circuitry mounted to the printed circuit board 144, for instance to power the capacitive touch regions, the control circuit, the wireless communication circuit, and/or other circuitry of the control unit 130.

The control unit 130 may be configured to receive a battery holder 170. The battery holder 170 may be configured to be installed within the void 148 defined by the control unit 130 (e.g., the housing 134). For example, the void 148 may be configured to receive the battery holder 170. The battery holder 170 may be configured to retain the battery 180 therein. The battery holder 170 may include a frame 175, a plate 182, and/or a positive battery contact 171 and a negative battery contact 172. The positive battery contact 171 may be a positive electrical contact and the negative battery contact 172 may be a negative electrical contact. The frame 175 may define top and bottom walls 179 and opposed side walls 173. The frame 175 (e.g., the opposed side walls 173) may define tabs 176A, 176B, 178. The tabs 176A, 176B, 178 may be configured to releasably secure the battery holder 170 within the control unit 130 (e.g., the void 148). The frame 175 (e.g., the top and bottom walls 179 and the opposed side walls 173) may define an opening 169. The frame 175 may include a rib 174 extending (e.g., across the opening 169) between the top and bottom walls 179. The opening 169 may be configured to receive the battery 180. For example, the positive battery contact 171 and the negative battery contact 172 may be connected to the frame 175 and may be received within the opening 169. The positive battery contact 171 and the negative battery contact 172 may be configured to be electrically connected to a positive terminal and a negative terminal of the battery 180, respectively, when the battery is received in the opening 169.

The frame 175 may be configured to receive the plate 182. For example, the plate 182 may comprise a printed circuit board (e.g., made of an FR-4 substrate). The frame 175 may captively engage the plate 182. For example, the frame 175 may define tabs 177 extending from one or more of the side walls 173 of the frame 175. The frame 175 may define one or more slots (not shown) that are configured to receive corresponding tabs of the plate 182. The tabs 177 and/or slots may be configured to retain the plate 182 within the battery holder 170. It should be appreciated that although the tabs 177 are shown extending from one of the side walls 173, the frame 175 may define tabs (e.g., such as the tabs 177) along the top and/or bottom walls 179 and/or one or both of the side walls 173.

The plate 182 may be configured to receive the battery 180. For example, the plate 182 may define an opening 184. The opening 184 may be configured to receive the positive battery contact 171 and the negative battery contact 172. The positive battery contact 171 may comprise spring arms 114 (e.g., two spring arms) configured to abut a surface of the battery 180 when the battery 180 is received within the opening 169 to provide a first electrical contact for the battery 180 (e.g., to the positive terminal of the battery). The spring arms 114 may be biased towards the battery 180 when the battery is received in the opening 169. The positive battery contact 171 may include a clip 115. The clip 115 may be configured to attach (e.g., mechanically and electrically attach) the positive battery contact 171 to the plate 182. For example, the clip 118 may be attached to (e.g., soldered to) an electrical pad (not shown) on the plate 182.

The negative battery contact 172 may define a tab 116 on a front surface 117. The tab 116 may be biased away from the front surface 117. The tab 116 may be configured to provide a second electrical contact for the battery 180 (e.g., to the negative terminal of the battery). For example, the tab 116 may be configured to abut a surface of the battery 180 when the battery 180 is received within the opening 169. The negative battery contact 172 may include a plurality of clips 118. The plurality of clips 118 may be configured to attach (e.g., mechanically and electrically attach) the negative battery contact 172 to the plate 182. For example, the plurality of clips 118 may be attached to (e.g., soldered to) electrical pads (not shown) on the plate 182.

The battery holder 170 may be configured to electrically connect the battery 180 to the control unit 130 (e.g., the printed circuit board 144). The battery holder 170 may be configured to receive a retention clip 186. The retention clip 186 may be configured to secure the battery 180 within the battery holder 170 (e.g., the opening 169). The retention clip 186 may define a panel 188 and a plurality of tabs 185, 187. The panel 188 may be configured to abut a surface of the battery 180, for example, to hold the battery 180 against the tab 116 of the negative battery contact 172. The tabs 185, 187 may be configured to engage corresponding features in the plate 182 and/or the frame 175 of the battery holder 170. For example, the tabs 185, 187 may be configured to be secured against a side the plate 182 located towards the frame 175. The tab 187 may be received through a gap 119 in the rib 174 when the tab 187 is secured against the plate 182.

The battery 180 may be electrically connected to the control unit 130 for powering the circuitry of the control unit 130. For example, as shown, the printed circuit board 144 may comprise a flexible cable portion 105 (e.g., a ribbon cable portion). The flexible cable portion 105 may provide an electrical connection between the battery 180 and the printed circuit board 144. The flexible cable portion 105 may comprise at least two electrical conductors (not shown) for electrically connecting the circuitry of the control unit 130 on the printed circuit board 144 to the positive and negative terminals of the battery 180. The flexible cable portion 105 may be attached (e.g., electrically and mechanically attached) to the battery holder 170. For example, the electrical conductors of the flexible cable portion 105 may be attached to (e.g., soldered to) electrical pads (not shown) on the plate 182. The plate 182 may comprise electrical traces (not shown) for electrically connecting the conductors of the flexible cable portion 105 to the clip 115 of the positive battery contact 171 and the clips 118 of the negative battery contact 172.

Figure 6:
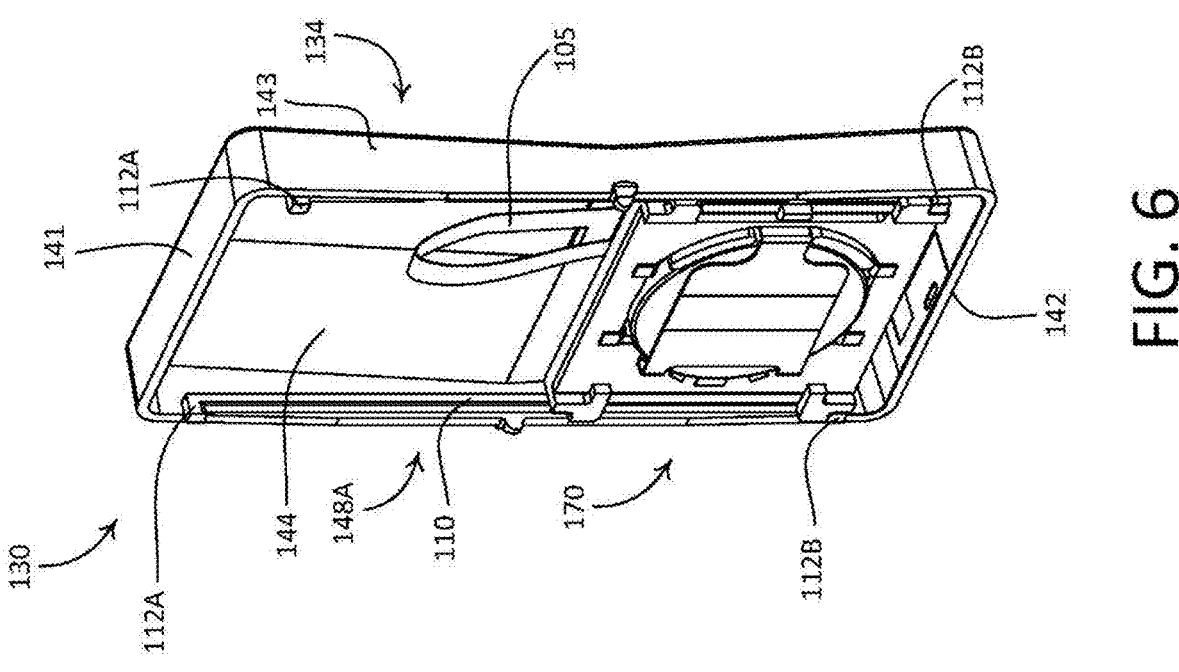
FIG. 6 is a rear perspective view of an example control unit of the example remote control device illustrated in FIG. 1 with the battery holder in a first position.

The battery holder 170 may be configured to adjust the location of the battery 180 within the control unit 130. For example, the location of the battery 180 may be adjusted based on the position of the paddle actuator 192 when the mechanical switch 190 is delivering power to the electrical load(s). The battery holder 170 may be operable between a first position and a second position. For example, the battery holder 170 may be configured to be translated between the first position and the second position. The first position may be defined as the battery holder 170 proximate to the lower wall 142 (e.g., a lower portion 148B of the void 148), for example, as shown in FIG. 6. For example, the battery holder 170 may be in the lower portion 148B of the void 148 when the battery holder 170 is in the first position. The second position may be defined as the battery holder 170 proximate to the upper wall 141 (e.g., an upper portion 148A of the void 148), for example, as shown in FIG. 5. For example, the battery holder 170 may be in the upper portion 148A of the void 148 when the battery holder 170 is in the second position.

The control unit 130 may define one or more mechanisms that enable the battery holder 170 to be translated within the void 148. For example, each of the opposed side walls 143 of the housing 134 may define a rib 110. The rib 110 may protrude from the side wall 143 into the void 148. The battery holder 170 may be configured to be translated along the rib 110 (e.g., between the first position and the second position). The rib 110 may be configured to retain the battery holder 170 within the control unit 130 (e.g., the void 148 of the control unit). The rib 110 may be configured to engage complimentary features of the battery holder 170. For example, the rib 110 may be configured to abut the tabs 176A, 176B, 178 of the battery holder 170 such that the battery holder 170 is retained within the void 148. The rib 110 may define stops 112A, 112B proximate to the upper wall 141 and the lower wall 142. The stops 112A, 112B may be configured to engage the tabs 176 to prevent the battery holder 170 from being translated beyond the first position or the second position, respectively. For example, the tabs 176A may engage the stops 112A when the battery holder 170 is in the second position and the tabs 176B may engage the stops 112B when the battery holder 170 is in the first position. In addition, the frame 175 may comprise a post 181 that is configured to be received in one of two detents 183 when the battery holder 170 is in the first position or the second position, for example, to hold the battery holder 170 in that position.

The control unit 130 may be configured to be attached to the base 120 with the light bar 139 located on a predetermined side of the control unit (e.g., the right side of the control unit as shown in FIG. 1), for example, such that the light bar 139 may be illuminated to indicate the amount of power presently being delivered to the electrical load. The control unit 130 may be configured to be attached to the base 120 with the light bar 139 located on a predetermined side of the control unit independent of a position of the paddle actuator 192 of the mechanical switch 190 (e.g., whether the upper portion or the lower portion of the paddle actuator 192 is protruding from the bezel 193). For example, the control unit 130 may be configured such that the battery 180 can be translated between the first position and the second position based on whether the upper portion or the lower portion of the paddle actuator 192 is protruding from the bezel 193.

The void 148 of the control unit 130 may be configured to receive a portion of the paddle actuator 192 of the mechanical switch 190 when the control unit 130 is attached to the base 120. The control unit 130 may define separate portions of the void 148, for example, the upper portion 148A and the lower portion 148B as shown in FIGS. 5 and 6. For example, when the mechanical switch 190 is in a first orientation (e.g., when the upper portion of the paddle actuator 192 is protruding from the bezel 193), the upper portion 148A may receive the upper portion of the paddle actuator 192 and the lower portion 148B may receive the battery holder 170. When the mechanical switch 190 is in a second orientation (e.g., when the lower portion of the paddle actuator 192 is protruding from the bezel 193), the lower portion 148B may receive the portion of the lower portion of the paddle actuator 192 and the upper portion 148A may receive the battery holder 170.

FIGS. 10-17 depict another example of a remote control device 200 (e.g., such as remote control device 100) that may be installed in a load control system, such as a lighting control system. The load control system may include a mechanical switch 290 that may be in place prior to installation of the remote control device 200, for example preexisting in the load control system. As shown, the mechanical switch 290 may be a standard decorator paddle switch. The load control system may further include one or more electrical loads, such as lighting loads. The mechanical switch 290 may be coupled in series electrical connection between an alternating current (AC) power source and the one or more electrical loads.

The mechanical switch 290 may include a paddle actuator 292 that may be actuated to turn on and/or turn off, the one or more electrical loads. The mechanical switch 290 may include a bezel 293 that surrounds the paddle actuator 292. An upper portion of the paddle actuator 1292 may protrude from the bezel 293 (e.g., in a first orientation) when the electrical load is off, and a lower portion of the paddle actuator 292 may protrude from the bezel 293 (e.g., in a second orientation, as shown in FIG. 4) when the electrical load is on, or vice versa. The mechanical switch 290 may include a yoke (not shown) that enables mounting of the mechanical switch 290 to a structure. For example, the yoke may be fastened to a single-gang wallbox that is installed in an opening of a structure (e.g., such as a wall, ceiling, etc.). As shown, a faceplate 296 may be secured to the mechanical switch 290, for instance to the yoke. The faceplate 296 may define a front surface 261 and an opposed rear surface 263. The front surface 261 may alternatively be referred to as an outer surface of the faceplate 296, and the rear surface 263 may alternatively be referred to as an inner surface of the faceplate 296. The faceplate 296 may be made of any suitable material, such as plastic. The remote control device 200 may be configured to be installed over the paddle actuator 292 of the mechanical switch 290 (e.g., mounted to the paddle actuator 292, the bezel 293, and/or the faceplate 296).

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a standalone dimmer switch that is electrically connected to the one or more lighting loads. In another example implementation, each of the one or more electrical loads may be a controllable light source (e.g., a screw-in light-emitting diode (LED) lamp) that each may include a respective integrated load control circuit and wireless communication circuit (e.g., the lighting load includes a corresponding load control device that is configured for wireless communication). It should be appreciated that the load control system is not limited to the example load control devices described herein.

The remote control device 200 may include a base 220 and a control unit 230 (e.g., a control module). The control unit 230 may be mounted to the base 220. For example, the base 220 may be configured to attach the remote control device 200 to the mechanical switch 290. The remote control device 200 may also include a spacer 210, which may be a shim and may be configured to compensate for mechanical switches having paddle actuators 292 that protrude at greater lengths from the bezel 293. The control unit 230 may be mounted to the base 220 with or without the spacer 210. When the spacer 210 is used, the spacer 210 may be attached to the base 220 and the control unit 230 may be attached to the spacer 210.

The base 220 may alternatively be referred to as a base portion, a mounting frame, or a mounting assembly. The control unit 230 and the base 220 may be configured such that the control unit 230 may be removably attached to the base 220. The base 220 may be mounted over (e.g., attached to) the paddle actuator 292 of the mechanical switch 290 without removing the faceplate 296. In this regard, the remote control device 200 may be mounted over an installed mechanical switch, such as the mechanical switch 290, without the need to remove the faceplate 296 and/or perform any electrical re-wiring of the mechanical switch 290. For example, the base 220 may be attached to the bezel 293 of the mechanical switch 290 using an adhesive 205. The adhesive 205 may be configured to secure the base 220 to the bezel 293.

As shown, the base 220 may define a frame 221. The frame 221 may define primary attachment tabs 222. The primary attachment tabs 222 may be configured to releasably secure the control unit 230 to the base 220. The primary attachment tabs 222 may be configured to engage the control unit 230 (e.g., a complementary structure of the control unit 230). The frame 221 may further define apertures 224. The apertures 224 may be configured to engage the spacer 210 (e.g., a complementary structure of the spacer 210).

The spacer 210 may define auxiliary attachment tabs 212. The auxiliary attachment tabs 212 may be configured to engage the control unit 230 (e.g., complementary structure of the control unit 230). The spacer 210 may define primary snaps 214. The primary snaps 214 may be configured to engage the primary attachment tabs 222 of the base 220. For example, the primary snaps 214 may releasably secure with the primary attachment tabs 222 of the base 220 such that the spacer 210 is releasably attached to the base 220. The spacer 210 may define clips 216. The clips 216 may be configured to engage the base 220 when the spacer 210 is attached to the base 220. For example, the clips 216 may be configured to secure the spacer 210 to the base 220. The spacer 210 may define pins 218. The pins 218 may be configured to align and/or maintain alignment between the spacer 210 and the base 220. The pins 218 may extend from a perimeter of the spacer 210. The pins 218 may be configured to be received by the base 220 (e.g., complementary structure of the base 220). For example, the pins 218 may be received by the apertures 224 when the spacer 210 is attached to the base 220.

The control unit 230 may include a user interface comprising an actuation portion 132, a housing 234, and a battery holder 270. For example, the actuation portion 232 may be attached to the housing 234. The housing 234 may define an upper wall 241, a lower wall 242, and opposed side walls 243. The upper wall 241, the lower wall 242, and the side walls 243 of the housing 234 may extend from respective edges of the actuation portion 232 (e.g., from a perimeter defined by the actuation portion 232). The housing 234 may define primary snaps 252 and/or auxiliary snaps 254. For example, the upper wall 241 and the lower wall 242 may define primary snaps 252 and/or auxiliary snaps 254. The control unit 230 may be attached to the base 220 using the primary snaps 252 and/or to the spacer 210 using the auxiliary snaps 254. The primary snaps 252 may be configured to engage the primary attachment tabs 222 of the base 220. For example, the primary snaps 252 may engage the primary attachment tabs 222 of the base 220 when the spacer 210 is not used. The auxiliary snaps 254 may be configured to engage the auxiliary attachment tabs 212 of the spacer 210. For example, the auxiliary snaps 254 may engage the auxiliary attachment tabs 212 of the spacer 210 when the spacer 210 is used.

Figures 16A, 16B, 16C, 16D, 16E:
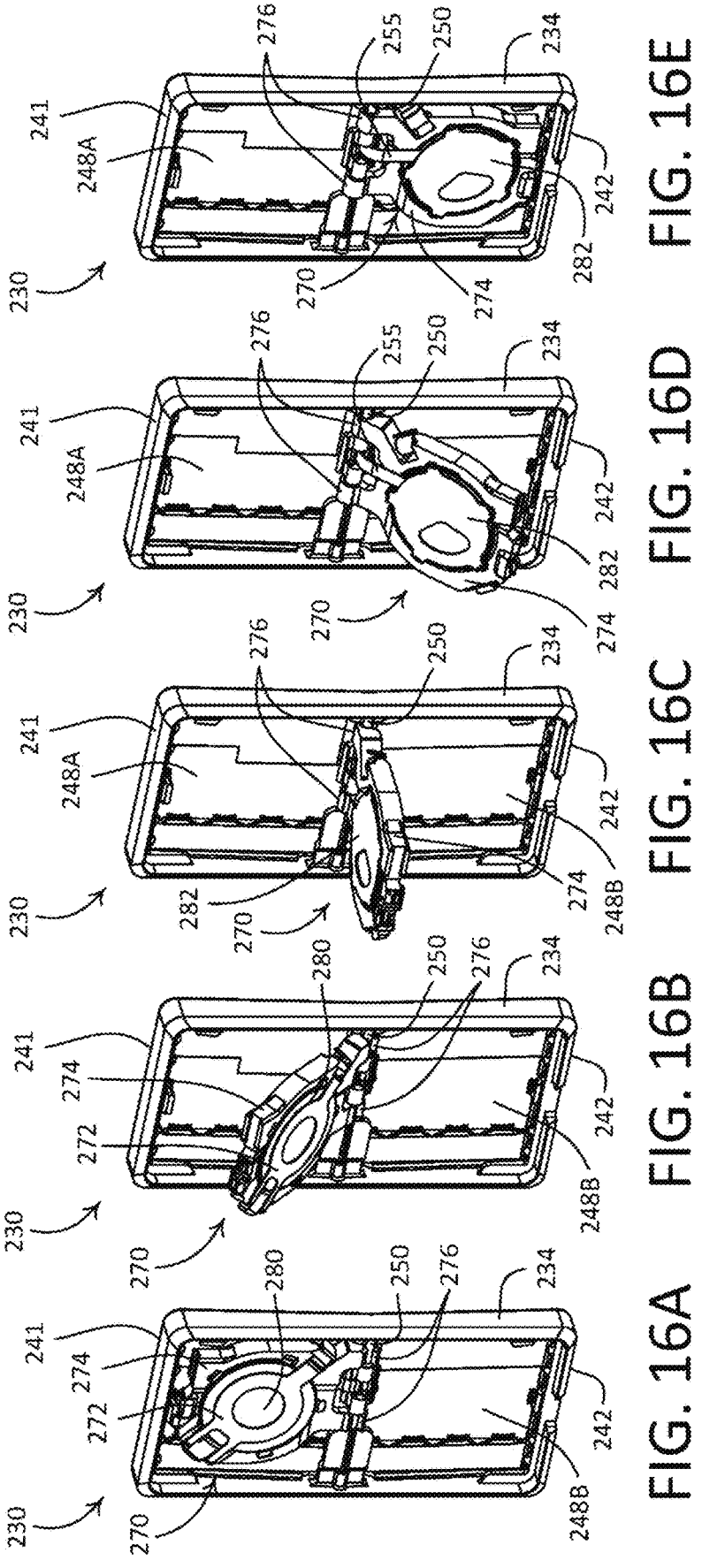
FIGS. 16A-16E are rear perspective views of the example control unit of the example remote control device illustrated in FIG. 10 with battery holder in various locations between the first position and the second position.
Figure 17:
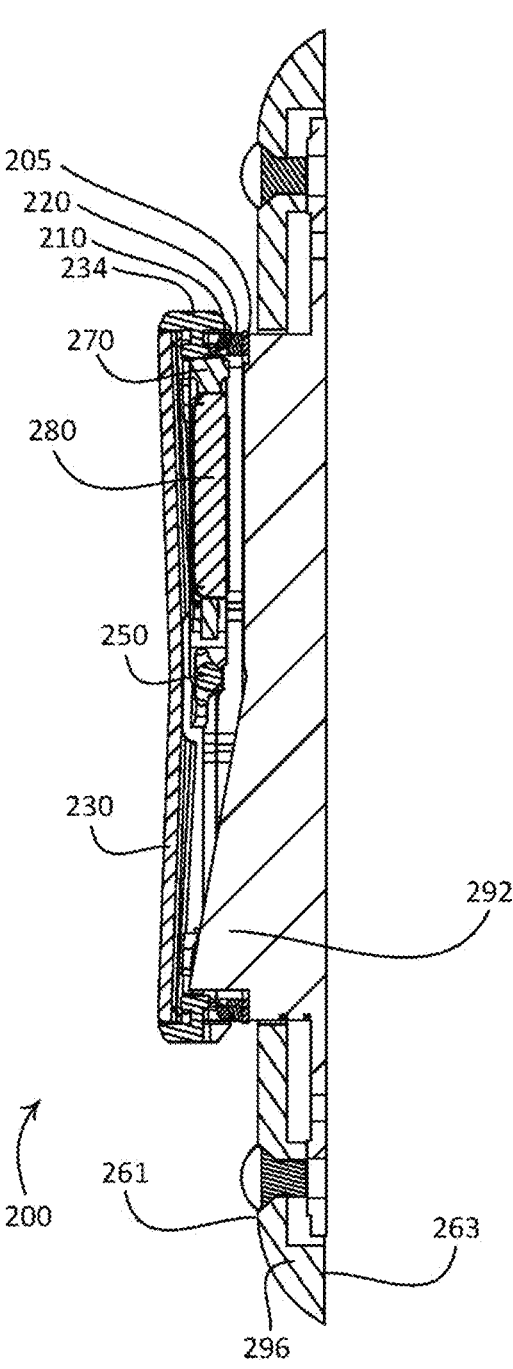
FIG. 17 is a cross-section view of the example remote control device illustrated in FIG. 10.

The housing 234 of the control unit 230 may include a pivot bar 250. The pivot bar 250 may extend between the opposed side walls 243 of the housing 234. The pivot bar 250 may be configured to receive the battery holder 270. For example, the battery holder 270 may pivotally mount to the pivot bar 250. The battery holder 270 may pivot about the pivot bar 250 between a first position and a second position. The first position may correspond to the battery holder being proximate to the lower wall 242 of the housing 234, for example, as shown in FIG. 16E. The second position may correspond to the battery holder 270 being proximate to the upper wall 241 of the housing 234, for example, as shown in FIG. 16A.

The control unit 230 may include a printed circuit board 244 (e.g., a flexible or rigid printed circuit board). The control unit 230 may also include a light bar 239 configured to be illuminated by one or more light sources 237 (e.g., one or more LEDs). The light bar 239 may be illuminated via a light guide film 246 on the printed circuit board 244. For example, the light sources 237 on the printed circuit board 244 may illuminate the light bar 239 through the light guide film 246. The light bar 239 may be illuminated to visibly display information to a user of the control unit 230. The front surface 235 of the actuation portion 232 may be actuated along the light bar 239 to adjust the amount of power delivered to the lighting load according to the position of the actuation.

Figure 15:
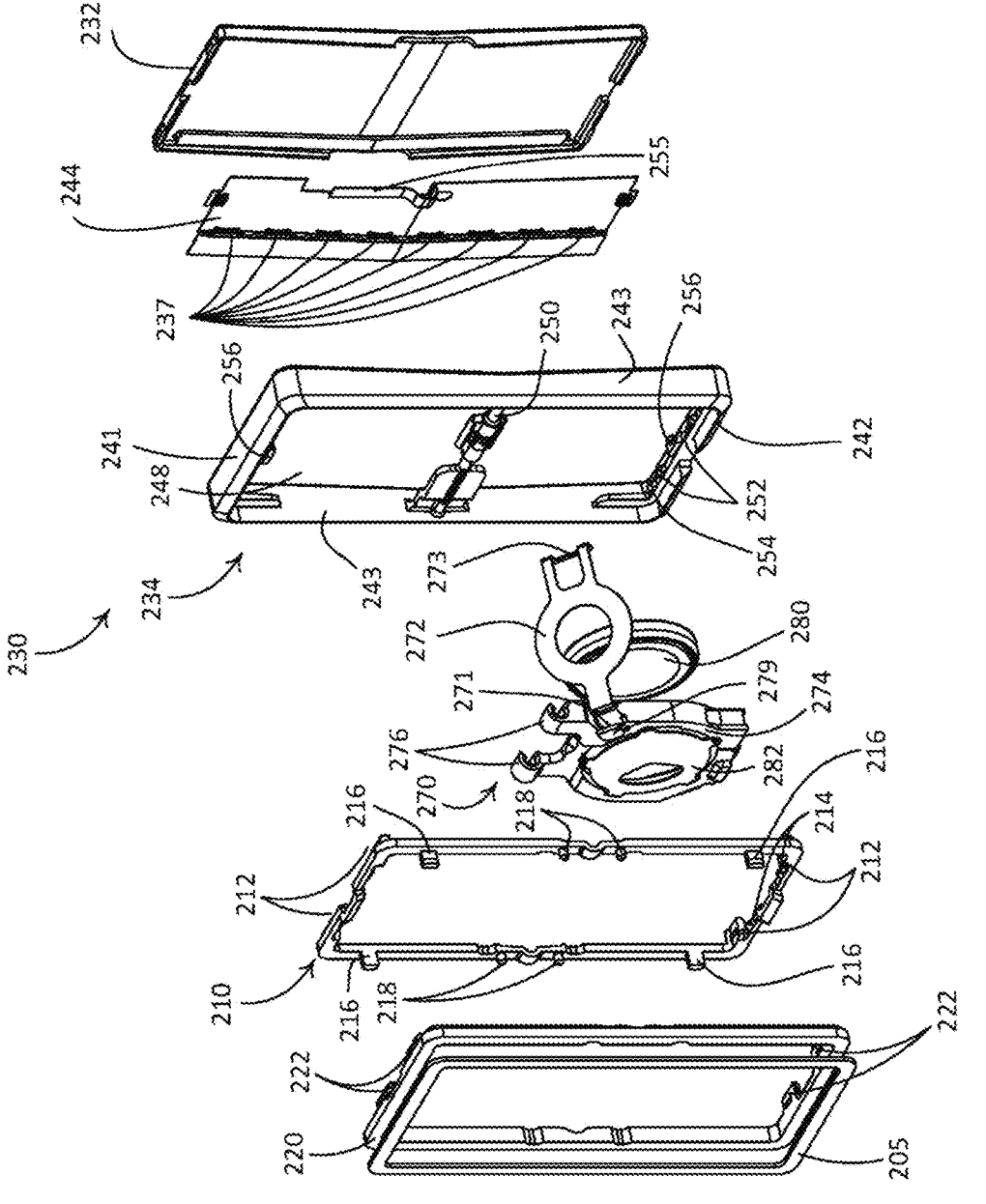
FIG. 15 is a partially exploded rear perspective view of the example control unit of the example remote control device illustrated in FIG. 10.

As shown in FIGS. 10-17, the control unit 230 may be rectangular in shape and elongate between the upper wall 241 and the lower wall 242. It should be appreciated that the control unit 230 is not limited to the illustrated rectangular geometry, and that control unit may alternatively be configured with other suitable geometries. In accordance with the illustrated orientation of the control unit 230, the upper wall 241 may be referred to as an upper end of the control unit 230 and the lower wall 242 may be referred to as a lower end of the control unit 230. The upper and lower walls 241, 242 of the control unit 230 may also be referred to as first and second ends of the housing 234, respectively. The control unit 230 (e.g., the housing 234) may define a void 248 (FIG. 15). The void 248 may be configured to receive the printed circuit board 244 in an attached position. The void 248 may be defined by the upper wall 241, the lower wall 242, and the opposing side walls 243. The void 248 may include an upper portion 248A and a lower portion 248B (e.g., as shown in FIGS. 16A-16E). The upper portion 248A may be defined between the pivot bar 250 and the upper wall 141. The lower portion 248B may be defined between the pivot bar 250 and the lower wall 142. The housing 234 may be made of any suitable material, such as plastic.

The actuation portion 232 may include a front surface 235 having an upper portion 236 and a lower portion 238. The actuation portion 232 may be configured to pivot in response to an actuation of the upper portion 236 and the lower portion 238. The control unit 230 may be configured to control an electrical load. For example, the control unit 230 may be configured to turn the electrical load on in response to an actuation of the upper portion 236 and to turn the electrical load off in response to an actuation of the lower portion 238. The front surface 235 of the actuation portion 232 of the control unit 230 may define a user interface that is configured to receive inputs, such as gestures, from a user of the remote control device 200. The user interface may be configured as a touch sensitive surface (e.g., a capacitive touch surface) that is configured to receive (e.g., detect) inputs, such as gestures, from a user of the control unit 230. For example, the printed circuit board 244 may include one or more capacitive touch regions, or surfaces. The printed circuit board 244 may include one or more linear capacitive touch surface that faces an inner surface of the actuation portion 232 when the printed circuit board 244 is disposed in the void 248. The front surface 235 of the actuation portion 232 may be configured to detect touches along an x-axis, a y-axis, or both an x-axis and a y-axis.

The control unit 230 may further include a control circuit (e.g., a processor, not shown) and a wireless communication circuit (e.g., an RF transceiver, not shown). The control unit 230 may be configured to translate one or more inputs (e.g., user inputs) from the user interface into respective control signals that may be used to control a load control device of a load control system. The one or more inputs may be applied via touches or presses of the upper portion 236 and/or lower portion 238 of the actuation portion 232. For example, the control circuit may be configured to receive input signals (e.g., that correspond to the user inputs) in response to actuations of the upper portion 236 and/or lower portion 238 by a user of the remote control device 200. For example, the input signals received by the control circuit may be the respective control signals translated from the control interface inputs. The control circuit may be configured to generate commands that the user desires the control unit 230 to execute in response to the input signals produced in response to actuations of the upper portion 236 and/or lower portion 238. The control unit 230 may be configured to cause the wireless communication circuit to transmit one or more control signals including the commands generated by the control circuit.

The control circuit may be configured to cause the wireless communication circuit to transmit respective commands that correspond to inputs and/or gestures received by the upper portion 236 and/or lower portion 238. For example, the remote control device 200 may be operable to transmit wireless signals, for example radio frequency (RF) signals, to a load control device, one or more electrical loads, and/or a central processor of a load control system. The remote control device 200 may be associated with the load control device and the one or more electrical loads during a configuration procedure of the load control system.

The control circuit may be configured to cause the wireless communication circuit to transmit respective commands that correspond to interpreted gestures received at the capacitive touch surface. For example, the remote control device 200 may be operable to transmit wireless signals, for example radio frequency (RF) signals, to a load control device, one or more electrical loads, and/or a central processor of a load control system. The remote control device 200 may be associated with the load control device and the one or more electrical loads during a configuration procedure of the load control system.

The light bar 239 of the control unit 230 may be configured to provide a visual indication of a command issued by the remote control device 200. For example, the control circuit may be configured to, upon receiving a gesture indicative of a command to change an amount of power delivered to an electrical load, such as a command to dim a lighting load, indicate the amount of power delivered to the electrical load by temporarily illuminating a number of the LEDs that corresponds with the desired amount of power (e.g., the desired dimming level of the lighting load). In such an example, the control circuit may be configured to cause the LEDs to be illuminated simultaneously, to illuminate sequentially with some or little overlap before fading, or to otherwise illuminate as desired. The control unit 230 may be configured to be attached to the base 220 with the light bar 239 located on a predetermined side of the control unit 230 (e.g., the right side of the control unit as shown in FIG. 1), for example, such that the light bar 239 may be illuminated to indicate the amount of power presently being delivered to the electrical load. The printed circuit board 244 may define a fold 247 such that the light sources 237 mounted thereto illuminate through the printed circuit board 244 and light guide film 246 to the light bar 239.

The illustrated control unit 230 may be battery-powered. The battery 280 (e.g., the illustrated coin cell battery) may be placed in electrical communication with the circuitry mounted to the printed circuit board 244, for instance to power the capacitive touch regions, the control circuit, the wireless communication circuit, and/or other circuitry of the control unit 230.

The control unit 230 may be configured to receive the battery holder 270. The battery holder 270 may include a housing 274, a retaining clip 272, positive battery contact 281, and a negative battery contact 282 (e.g., a backplate). The positive battery contact 281 may be a positive electrical contact and the negative battery contact 282 may be a negative electrical contact. For example, the positive battery contact 281 and the negative battery contact 282 may be connected to the housing 274. The battery holder 270 may be configured to retain the battery 280 therein. The battery holder 270 may define a cavity 277. For example, the housing 274 and the negative battery contact 282 may define the cavity 277. The negative battery contact 282 may be configured to attach to the housing 274. The negative battery contact 282 may be configured to define a rear surface of the cavity 277. The cavity 277 may be configured to receive the battery 280. The retaining clip 272 may be configured to secure the battery 280 within the cavity 277. The retaining clip 272 may define a pivot clip 271 and a locking clip 273. The pivot clip 271 may pivotally mount the retaining clip 272 to the battery holder 270. For example, the retaining clip 272 may pivot using the pivot clip 271. The locking clip 273 may be configured to secure the retaining clip 272 to the housing 274 such that the battery 280 is retained therein. The pivot clip 271 may comprise a retention tab 279 that may retain the pivot clip 271 in the battery holder 270 when the retaining clip 272 is moved to the open position.

The battery holder 270 may be configured to be installed within the void 248 defined by the control unit 230 (e.g., the housing 234). For example, the void 248 may be configured to receive the battery holder 270. The battery holder 270 may be configured to retain the battery 280 therein. The battery holder 270 may include attachment clips 276. The attachment clips 276 may be c-clips (e.g., such as right-angle c-clips). The attachment clips 276 may be configured to rotatably attach to the pivot bar 250. For example, the attachment clips 276 may be configured to pivot about the pivot bar 250, for example, as the battery holder is moved between the first position and the second position. The pivot bar 250 may define a pivot axis. The battery holder 270 may be configured to pivot about the pivot axis. The pivot axis may be located at a midpoint of the control unit 230. Alternatively, the pivot bar 250 may be a pin (e.g., a rod) and the battery holder 270 may comprise fully closed loops rather than the attachment clips 276. The pin may be slid into the closed loops of the battery holder and then the ends of the pin may be attached to the housing 234.

The battery holder 270 may be configured to electrically connect the battery 280 to the control unit 230 (e.g., the printed circuit board 244) for powering the circuitry of the control unit 230. The battery holder 270 may be configured to maintain electrical contact between the battery 280 and the printed circuit board 244 when the battery holder 270 is moved between the first position and the second position. For example, the positive battery contact 281 and the negative battery contact 282 of the battery holder 270 may be configured to be electrically connected to a positive terminal and a negative terminal of the battery 280, respectively, when the battery is received in the cavity 277. The positive battery contact 281 may operate as a spring that is biased towards the battery 280 when the battery is received in the cavity 277.

The control unit 230 may include a flexible cable 255 that is attached (e.g., mechanically and electrically connected) to the printed circuit board 244. The flexible cable 255 may be attached (e.g., mechanically and electrically connected) to the battery holder 270. The flexible cable 255 may comprise at least two electrical conductors (not shown) for electrically connecting the circuitry of the control unit 230 on the printed circuit board 244 to the positive and negative terminals of the battery 280. For example, a first one of the electrical conductors of the flexible cable 255 may be electrically connected to positive battery contact 281 and a second one of the electrical conductors of the flexible cable 255 may be electrically connected to the negative battery contact 282. Alternatively, the retaining clip 272 may operate as a positive battery contact of the battery holder 270.

It should be appreciated that electrical connection between the battery 280 and the printed circuit board 244 may be achieved in other ways. For example, the battery holder 270 may abut a first post (not shown) on the control unit 230 in the second position and may abut a second post (not shown) on the control unit 230 in the first position. The first post and the second post may be configured to provide the electrical connection between the battery 280 and the printed circuit board 244. The first post may be proximate to the upper wall 241 and the second post may be proximate to the lower wall 242.

The battery holder 270 may be configured to adjust the location of the battery 280 within the control unit 230. For example, the location of the battery 280 may be adjusted based on the position of the paddle actuator 292 when power is being delivered to the electrical load(s) associated with the mechanical switch 290. The battery holder 270 may be operable between a first position and a second position. For example, the battery holder 270 may be configured to be pivoted between the first position and the second position. The first position may be defined as the battery holder 270 proximate to the lower wall 242 (e.g., a lower portion 248B of the void 248), for example, as shown in FIG. 16E. For example, the battery holder 270 may be in the lower portion 248B of the void 248 when the battery holder 270 is in the first position. The second position may be defined as the battery holder 270 proximate to the upper wall 241 (e.g., an upper portion 248A of the void 248), for example, as shown in FIG. 16A. For example, the battery holder 270 may be in the upper portion 248A of the void 248 when the battery holder 270 is in the second position.

Figure 10:
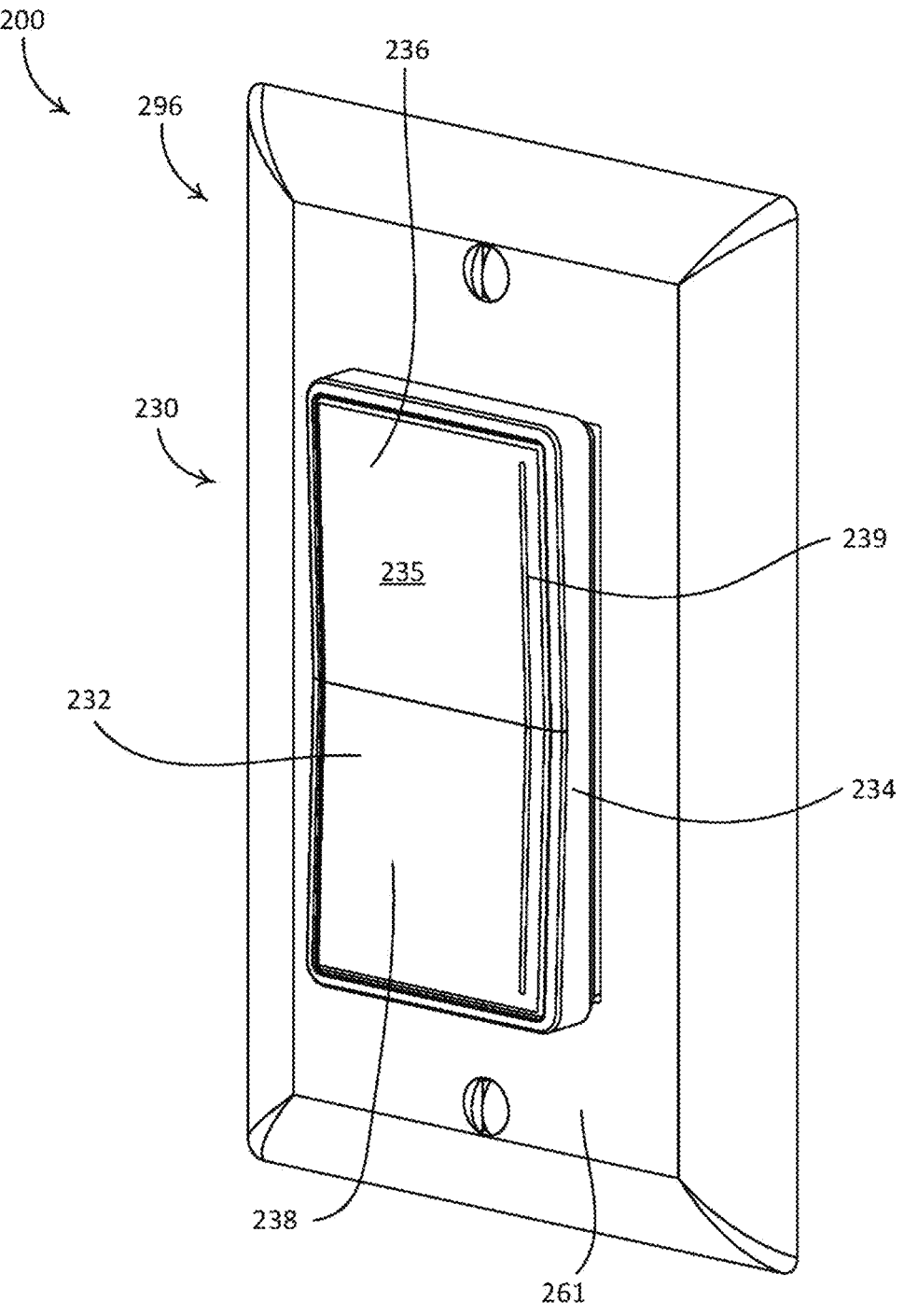
FIG. 10 is a perspective view of another example remote control device mounted over a mechanical switch.
Figure 12:
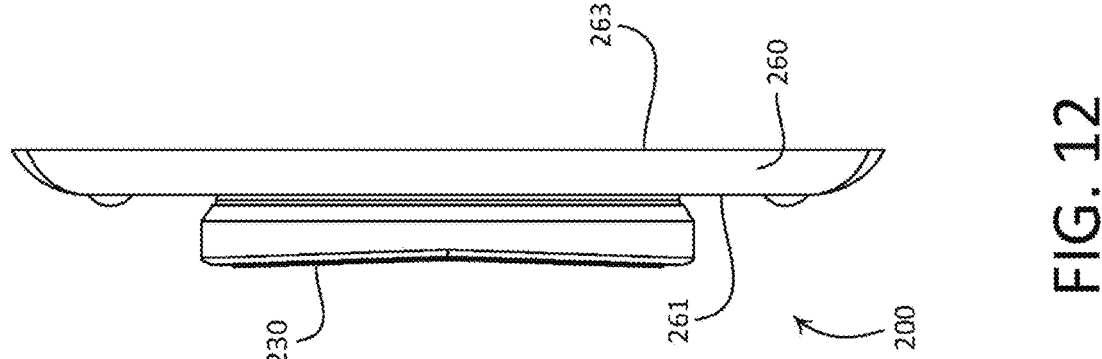
FIG. 12 is a side view of the other example remote control device illustrated in FIG. 10.
Figure 11:
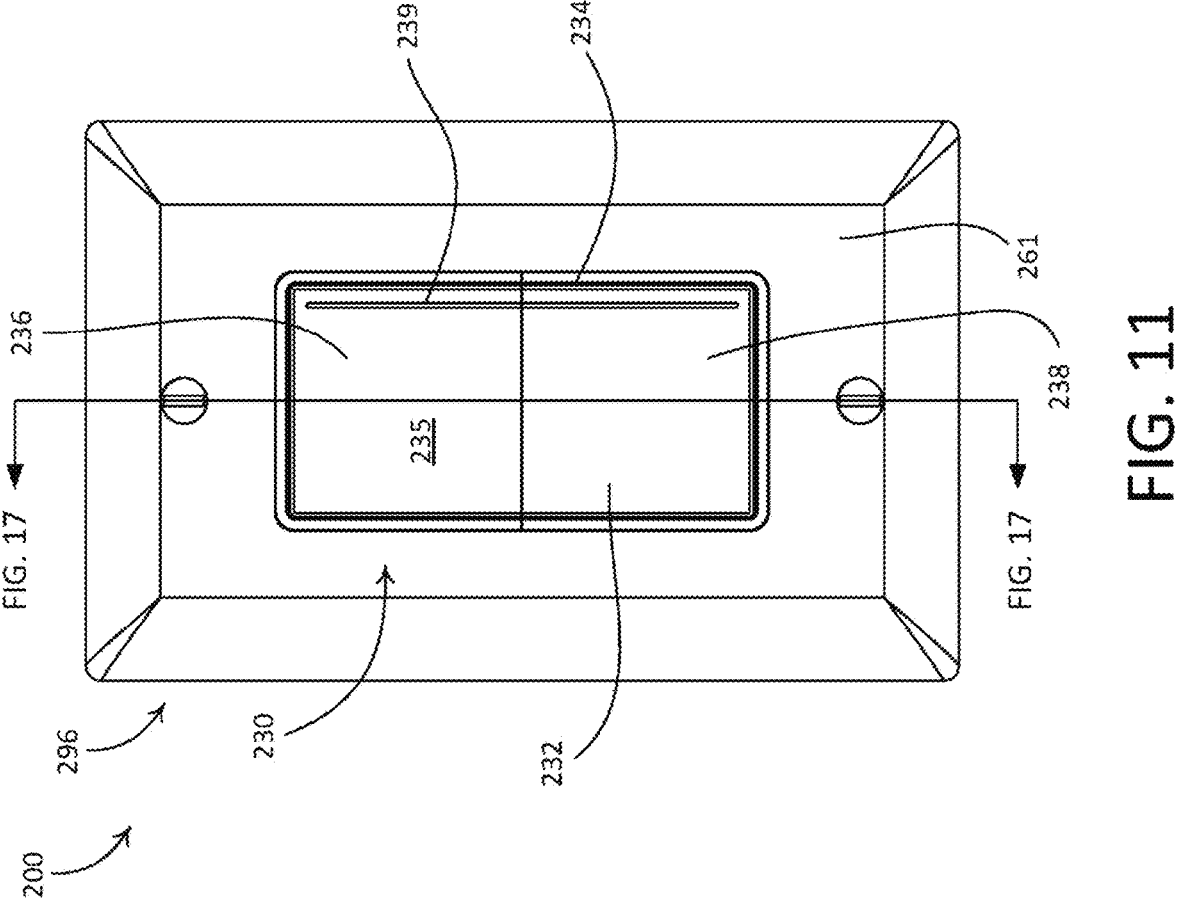
FIG. 11 is a front view of the other example remote control device illustrated in FIG. 10.
Figure 13:
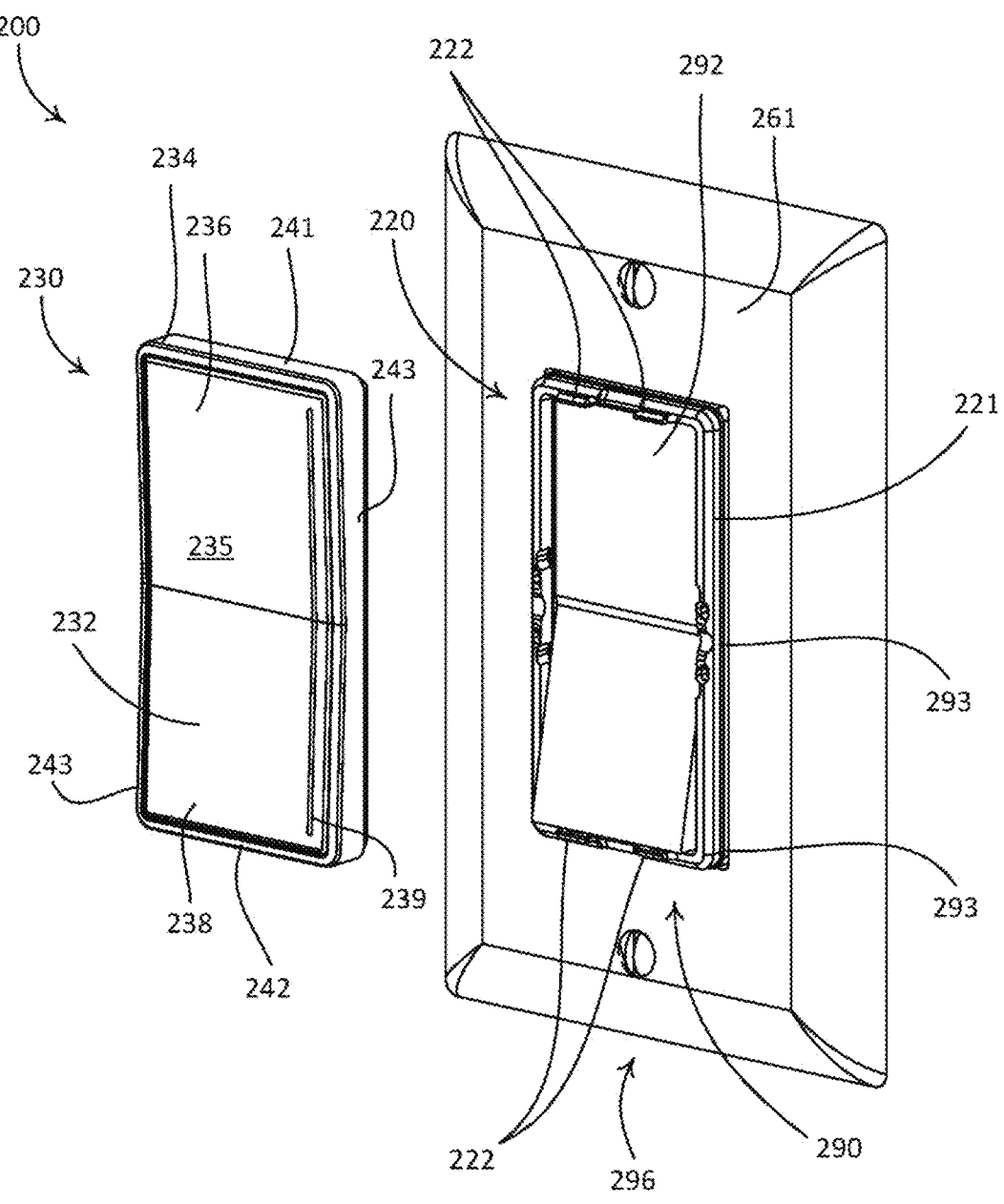
FIG. 13 is a partially exploded front perspective view of the example remote control device illustrated in FIG. 10.
Figure 14:
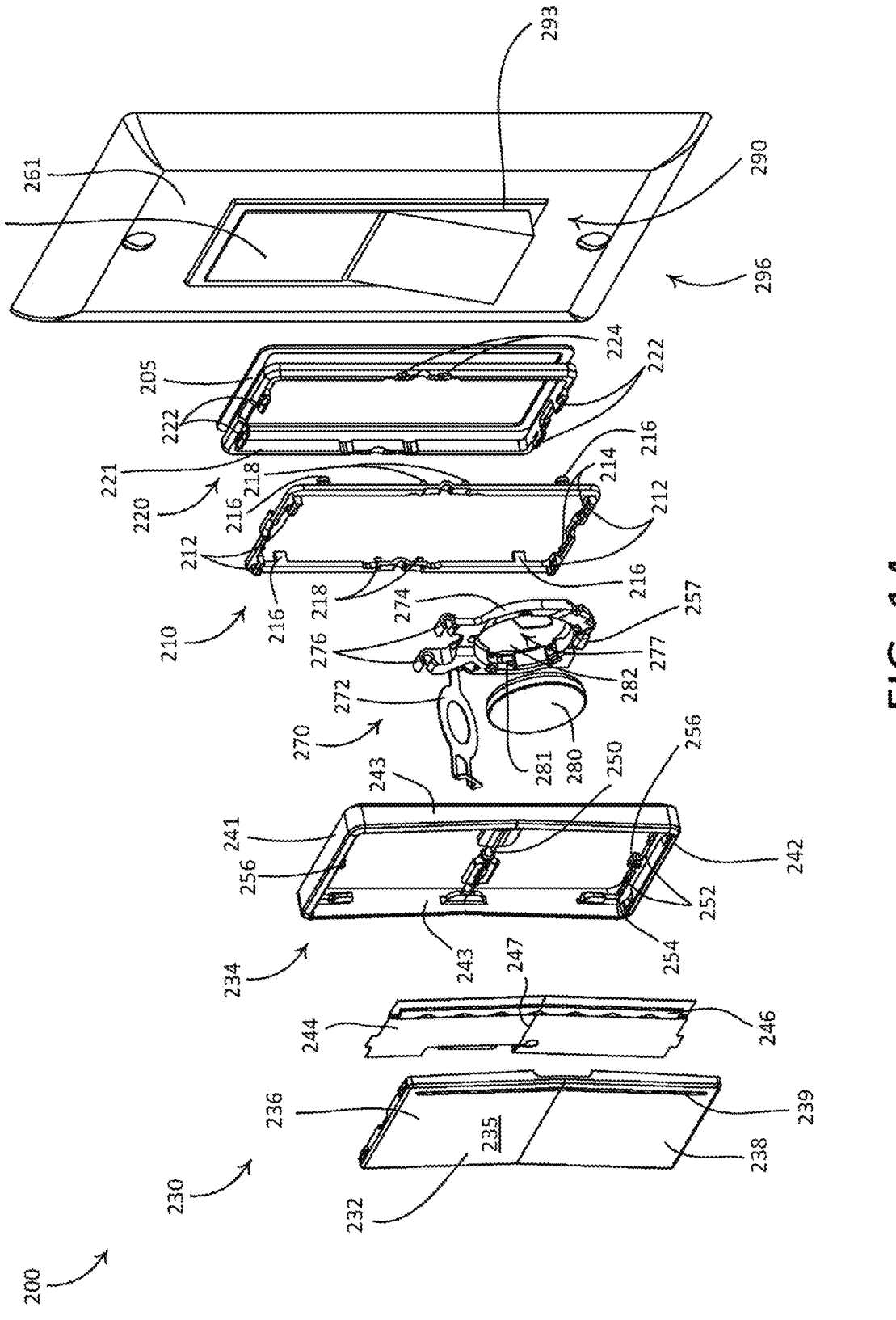
FIG. 14 is another partially exploded front perspective view of the example remote control device illustrated in FIG. 10.

The control unit 230 (e.g., the housing 234) may define stops 256 in the upper portion 248A and the lower portion 248B of the void 248. The stops 256 may extend into the void 248 from the upper wall 241 and the lower wall 242. The stops 256 may be configured to prevent the battery holder 270 from pivoting beyond the first position and the second position, respectively. The stops 256 may be configured to prevent the battery holder 270 from abutting the printed circuit board 244. The stops 256 may be configured to snap into an outer edge 257 of the housing 274 of the battery holder 270 when the battery holder 270 is in the first position or the second position. The control unit 230 may be configured to be attached to the base 220 with the light bar 239 located on a predetermined side of the control unit (e.g., the right side of the control unit as shown in FIG. 10), for example, such that the light bar 239 may be illuminated to indicate the amount of power presently being delivered to the electrical load. The control unit 230 may be configured to be attached to base 220 with the light bar 239 located on a predetermined side of the control unit independent of a position of the paddle actuator 292 of the mechanical switch 290 (e.g., whether the upper portion or the lower portion of the paddle actuator 292 is protruding from the bezel 293). For example, the control unit 230 may be configured such that the battery 280 can be pivoted between the first position and the second position based on whether the upper portion or the lower portion of the paddle actuator 292 is protruding from the bezel 293.

The void 248 of the control unit 230 may be configured to receive a portion of the paddle actuator 292 of the mechanical switch 290 when the control unit 230 is attached to the base 220. The control unit 230 may define separate portions of the void 248, for example, the upper portion 248A and the lower portion 248B as shown in FIGS. 16A-16E. When the mechanical switch 290 is in a first orientation (e.g., when the upper portion of the paddle actuator 292 is protruding from the bezel 293), the upper portion 248A may receive the upper portion of the paddle actuator 292 and the lower portion 248B may receive the battery holder 270. When the mechanical switch 290 is in a second orientation (e.g., when the lower portion of the paddle actuator 292 is protruding from the bezel 293), the lower portion 248B may receive the portion of the lower portion of the paddle actuator 292 and the upper portion 248A may receive the battery holder 270.

In some installations, the control unit 230 may not be offset from the paddle actuator 292 of the mechanical switch 290 by enough distance when control unit 230 is mounted to the base 220, and the control unit 230 may even contact the paddle actuator 292. In this scenario, the control unit 230 may cause the paddle actuator 292 of the mechanical switch 290 to change from the on position to the off position when a user actuates the actuation portion 232. The control unit 230 (e.g., the housing 234) may define flanges 268 in the upper portion 248A and the lower portion 248B of the void 248. The flanges 268 may extend into the void 248 from the opposed side walls 243. When the control unit 230 is being mounted onto the base 220 during installation of the remote control device 200, the flanges 268 may contact the paddle actuator 292 to indicate to the installer that the control unit 230 may not be offset from the paddle actuator 292 by enough distance. The installer may then install the spacer 210 (or multiple spacers) onto the base 220 to provide additional distance between the control unit 230 and the paddle actuator 292.

Figure 18:
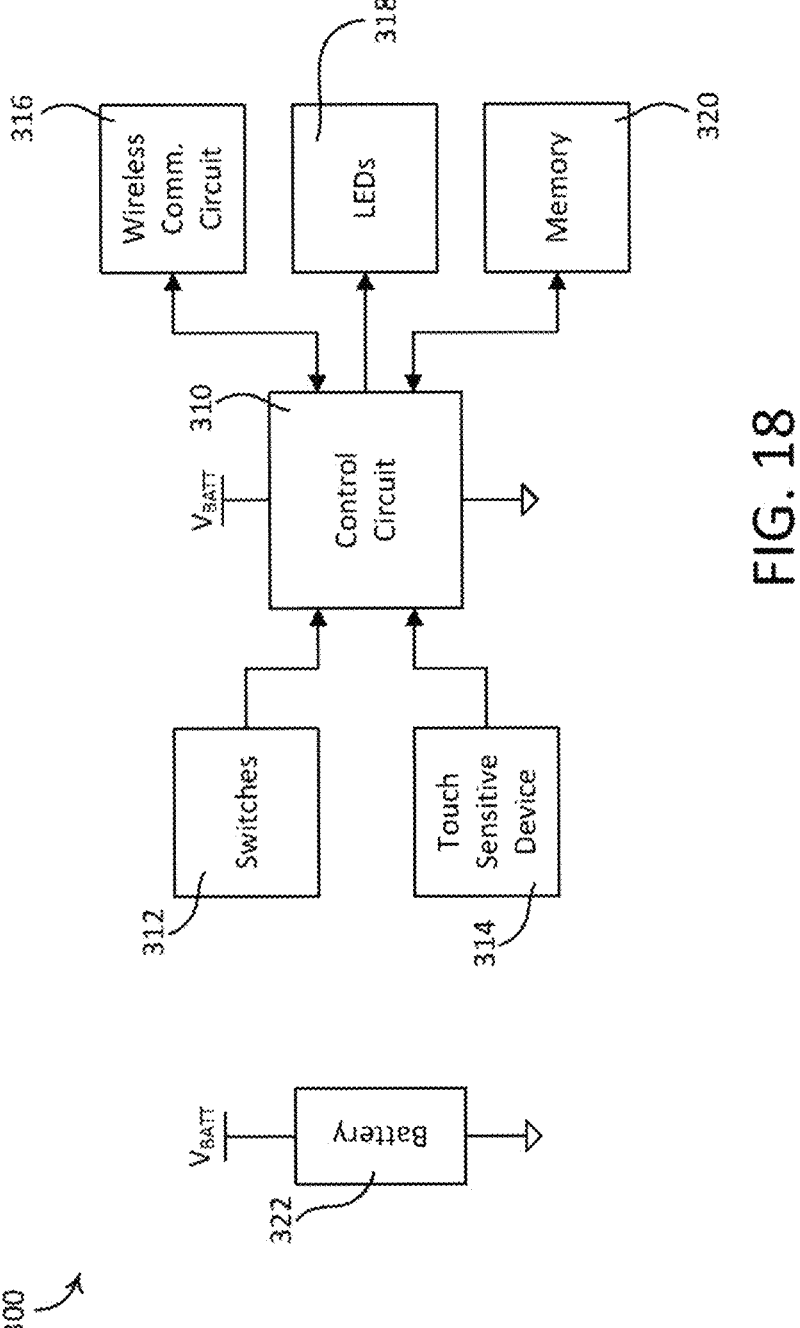
FIG. 18 is a block diagram of an example control device.

FIG. 18 is a block diagram of an example control device 300 (e.g., a remote control device), which may be deployed as the remote control device 100 of FIGS. 1-9 and/or the remote control device 200 of FIGS. 10-17. The control device 300 may include a control circuit 310, one or more actuators 312 (e.g., buttons and/or switches), a touch sensitive device 314, a wireless communication circuit 316, one or more LEDs 318, a memory 320, and/or a battery 322. The memory 320 may be configured to store one or more operating parameters (e.g., such as a preconfigured color scene or a preset light intensity) of the control device 300. The battery 322 may provide power to one or more of the components shown in FIG. 18.

The actuators 312 (e.g., a mechanical tactile switches) that may be actuated in response to an actuation of one or more respective buttons of the control device (e.g., the actuation portion 132 of the remote control device 100 and/or the actuation portion 232 of the remote control device 200). The actuators 312 may be configured to send respective input signals to the control circuit 310 in response to actuations of the buttons. The touch sensitive device 314 may include a capacitive or resistive touch element arranged behind, for example, the actuation portion 132 of the remote control device 100 and/or the actuation portion 232 of the remote control device 200. The touch sensitive device 314 may be responsive to actuation of, for example, the touch sensitive surface of the actuation portion 132 and/or the touch sensitive surface the actuation portion 232. The touch sensitive device 314 may be configured to detect point actuations and/or gestures (e.g., the gestures may be effectuated with or without physical contacts with the touch sensitive device 314) and provide respective input signals to the control circuit 310 indicating the detection.

The control circuit 310 may be configured to translate the input signals provided by the actuators 312, and/or the touch sensitive device 314 into control data (e.g., digital control signals) for controlling one or more electrical loads. The control circuit 310 may cause the control data (e.g., digital control signals) to be transmitted to the electrical loads via the wireless communication circuit 316. For example, the wireless communication circuit 316 may transmit a control signal including the control data to the one or more electrical loads or to a central controller of the concerned load control system. The control circuit 310 may control the LEDs 318 to illuminate a visual indicator (e.g., the light bar 139 of the remote control device 100 and/or the light bar 239 of the remote control device 200) to provide feedback about various conditions.

It should be appreciated that the example remote control devices 100, 200 illustrated and described herein may provide a simple retrofit solution for an existing switched control system and may ease the installation of a load control system or enhance an existing load control system installation. A load control system that integrates one or more remote control devices 100, 200 may provide energy savings and/or advanced control features, for example without requiring any electrical re-wiring and/or without requiring the replacement of any existing mechanical switches.

It should further be appreciated that load control systems into which the example remote control devices 100, 200 may be integrated are not limited to the example load control devices and/or electrical loads described above. For example, load control systems into which the example remote control devices 100, 200 may be integrated may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; hydraulic valves for use in one or more radiators of a radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

The invention claimed is:

1. A remote control device for use in a load control system, the remote control device configured to be mounted over an installed mechanical switch that controls whether power is delivered to an electrical load, the remote control device comprising:

a base that defines an opening that is configured to receive a protruding portion of a paddle actuator of the mechanical switch therein, the protruding portion of the paddle actuator projecting outward when the mechanical switch is operated into a position that causes power to be delivered to the electrical load, wherein when the protruding portion is received in the opening, the base at least partially surrounds the paddle actuator;

a control unit that is configured to be attached to the base, the control unit comprising a control interface and a housing, the control unit further configured to transmit a control signal in response to a user input, the housing comprising an upper wall, a lower wall, and opposed side walls, the housing defining a void bounded by the upper wall, the lower wall, and the opposed side walls, wherein the opposed side walls comprise ribs extending into the void;

a battery that is configured to power the control unit; and a battery holder that is configured to retain the battery therein, the battery holder configured to be installed within the void defined by the housing, wherein the battery holder is configured to be translated along the ribs within the void between a first position and a second position such that a location of the battery within the control unit is adjusted, the first position being in a lower portion of the void that is proximate to the lower wall and the second position being in an upper portion of the void that is proximate to the upper wall.

2. The remote control device of claim 1, wherein the battery holder is operable between the first position and the second position such that the battery holder is configured to be in the first position when an upper portion of the paddle actuator is the protruding portion and the battery holder is configured to be in the second position when the lower portion of the paddle actuator is the protruding portion.

3. The remote control device of claim 1, wherein the battery holder comprises a plurality of tabs configured to captively engage the ribs when the battery holder is installed within the control unit.

4. The remote control device of claim 3, wherein at least one of the plurality of tabs is configured to abut a front side of a respective one of the ribs and at least one of the plurality of tabs is configured to abut a rear side of the respective one of the ribs such that the battery holder is configured to translate in a plane parallel to the respective one of the ribs.

5. The remote control device of claim 1, wherein each of the ribs defines a first stop proximate to the lower wall of the housing and a second stop proximate to the upper wall of the housing, and wherein the first stop is configured to stop the battery holder in the first position, and wherein the second stop is configured to stop the battery holder in the second position.

6. The remote control device of claim 1, further comprising a flexible connector configured to electrically connect the battery holder and a printed circuit board of the control unit.

7. The remote control device of claim 1, wherein the battery holder is configured to electrically connect the battery to the control unit.

8. The remote control device of claim 7, wherein the battery holder comprises a pair of electrical contacts configured to abut respective positive and negative terminals of the battery.

9. The remote control device of claim 1, wherein the battery holder comprises a frame, a plate configured to be attached to the frame, and a battery socket, wherein the plate defines an opening configured to receive the battery socket.

10. The remote control device of claim 9, wherein the battery socket defines a plurality of clips configured to secure the battery socket to the plate.

11. The remote control device of claim 9, wherein the frame defines one or more tabs configured to secure the plate within the battery holder.

12. The remote control device of claim 9, wherein the battery holder is configured to receive a retaining clip to secure the battery within the battery holder.

13. The remote control device of claim 12, wherein the retaining clip defines a plurality of tabs configured to engage complimentary features on the plate.

14. The remote control device of claim 1, wherein the base is configured to attach the remote control device to the mechanical switch.

15. The remote control device of claim 14, wherein the base is configured to be attached to the protruding portion of the paddle actuator.

16. The remote control device of claim 15, wherein the base defines a tab configured to attach to the protruding portion of the paddle actuator.

17. The remote control device of claim 1, wherein the control unit is removably attachable to the base.

18. The remote control device of claim 1, wherein the void of the control unit is configured to receive the protruding portion of the paddle actuator when the control unit is attached to the base.

19. The remote control device of claim 1, wherein the control unit comprises a wireless communication circuit that is configured to transmit the control signal, the control unit configured to translate the user input from the control interface into the control signal.

20. The remote control device of claim 1, further comprising a spacer between the base and the control unit.

21. The remote control device of claim 20, wherein the spacer is configured to releasably attach to the base and the control unit is configured to releasably attach to the spacer.

22. The remote control device of claim 21, wherein the spacer defines auxiliary attachment tabs that are configured to engage the control unit.

23. The remote control device of claim 21, wherein the spacer defines snaps that are configured to engage the base.

24. A battery holder for a remote control device, the battery holder comprising:

a frame configured to attach the battery holder to the remote control device;

a plate configured to be attached to the frame, the plate defining an opening therethrough;

a battery socket configured to receive a battery for powering the remote control device, the battery socket configured to be received by the opening in the plate; and a retaining clip configured to attach to the plate such that the battery is secured within the battery holder, wherein the battery holder is configured to translate within the remote control device between a first position and a second position while maintaining electrical connection with a printed circuit board of the remote control device.

25. The battery holder of claim 24, wherein the battery socket comprises a tab configured to abut a first terminal of the battery and the retaining clip is configured to abut a second terminal of the battery.

26. The battery holder of claim 24, further comprising a plurality of tabs configured to captively engage complimentary features of the remote control device when the battery holder is installed within the remote control device such that the battery holder is configured to be translated between the first position and the second position.

27. The battery holder of claim 26, wherein at least one of the plurality of tabs is configured to abut a front side of a rib defined by the remote control device and at least one of the plurality of tabs is configured to abut a rear side of the rib such that the battery holder is configured to be translated in a plane parallel to the rib.

28. The battery holder of claim 26, wherein the plurality of tabs is configured to engage corresponding stops defined by the remote control device to stop the battery holder in the first position and the second position.

* * * * *